(12) United States Patent
He et al.

(10) Patent No.: US 9,047,429 B2
(45) Date of Patent: Jun. 2, 2015

(54) IN-PLACE RESYNTHESIS AND REMAPPING TECHNIQUES FOR SOFT ERROR MITIGATION IN FPGA

(71) Applicant: THE REGENTS OF THE UNIVERSITY OF CALIFORNIA, Oakland, CA (US)

(72) Inventors: Lei He, Irvine, CA (US); Ju-Yueh Lee, Taipei (TW); Zhe Feng, Liaoning (CN); Naifeng Jing, Shanghai (CN)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 13/850,898

(22) Filed: Mar. 26, 2013

(65) Prior Publication Data

US 2013/0305199 A1 Nov. 14, 2013

Related U.S. Application Data

(63) Continuation of application No. PCT/US2011/054096, filed on Sep. 29, 2011.

(60) Provisional application No. 61/487,133, filed on May 17, 2011, provisional application No. 61/409,081, filed on Nov. 1, 2010, provisional application No. 61/387,572, filed on Sep. 29, 2010.

(51) Int. Cl.
*G06F 17/50* (2006.01)
*H03K 19/003* (2006.01)

(52) U.S. Cl.
CPC .......... *G06F 17/505* (2013.01); *G06F 17/5054* (2013.01); *G06F 2217/70* (2013.01); *H03K 19/0033* (2013.01); *H03K 19/00369* (2013.01)

(58) Field of Classification Search
CPC G06F 17/5054; G06F 17/505; G06F 17/5045
USPC .................................. 716/110–112, 116–117
See application file for complete search history.

(56) References Cited

U.S. PATENT DOCUMENTS 5,426,379 A * 6/1995 Trimberger ...................... 326/39
5,892,961 A * 4/1999 Trimberger ...................... 712/10
(Continued)

FOREIGN PATENT DOCUMENTS

WO 2012/047735 A2 4/2012

OTHER PUBLICATIONS

Srinivasan, S., et al., "Improving soft error tolerance of configuration bits", 2004, IEEE, pp. 107-110.*
(Continued)

*Primary Examiner* — Stacy Whitmore
(74) *Attorney, Agent, or Firm* — John P. O'Banion

(57) ABSTRACT

In-place resynthesis for static memory (SRAM) based Field Programmable Gate Arrays (FPGAs) toward reducing sensitivity to single event upsets (SEUs). Resynthesis and remapping are described which have a low overheard and improve FPGA designs without the need of rerouting LUTs of the FPGA. These methods include in-place reconfiguration (IPR), in-place X-filling (IPF), and in-place inversion (IPV), which reconfigure LUT functions only, and can be applied to any FPGA architecture. In addition, for FPGAs with a decomposable LUT architecture (e.g., dual-output LUTs) an in-place decomposition (IPD) method is described for remapping a LUT function into multiple smaller functions leveraging the unused outputs of the LUT, and making use of built-in hard macros in programmable-logic blocks (PLBs) such as carry chain or adder. Methods are applied in-place to mapped circuits before or after routing without affecting placement, routing, and design closure.

23 Claims, 22 Drawing Sheets

(56) References Cited

U.S. PATENT DOCUMENTS

| | | | |
|---|---|---|---|
| 5,931,959 A | 8/1999 | Kwiat | |
| 6,256,758 B1* | 7/2001 | Abramovici et al. | 714/724 |
| 6,668,237 B1* | 12/2003 | Sundararajan et al. | 702/119 |
| 6,904,577 B2* | 6/2005 | Schubert et al. | 716/103 |
| 6,963,217 B2* | 11/2005 | Samudrala et al. | 326/11 |
| 7,243,329 B2* | 7/2007 | Chua et al. | 716/104 |
| 7,310,759 B1* | 12/2007 | Carmichael et al. | 714/725 |
| 7,389,460 B1 | 6/2008 | Demara | |
| 7,509,618 B1* | 3/2009 | Hutton et al. | 716/104 |
| 7,576,557 B1* | 8/2009 | Tseng et al. | 326/9 |
| 7,757,198 B1* | 7/2010 | Zhao et al. | 716/103 |
| 8,117,497 B1* | 2/2012 | Lesea | 714/30 |
| 8,117,580 B1* | 2/2012 | Trimberger | 716/116 |
| 8,146,028 B1* | 3/2012 | Lesea | 716/104 |
| 2002/0069396 A1* | 6/2002 | Bhattacharya et al. | 716/7 |
| 2002/0157071 A1 | 10/2002 | Schiefele | |
| 2005/0004774 A1* | 1/2005 | Volk et al. | 702/108 |
| 2005/0041149 A1* | 2/2005 | Chan et al. | 348/553 |
| 2005/0125749 A1* | 6/2005 | Goodnow et al. | 716/3 |
| 2005/0257186 A1* | 11/2005 | Zilbershlag | 716/18 |
| 2006/0001444 A1* | 1/2006 | Chua et al. | 326/37 |
| 2006/0195822 A1* | 8/2006 | Beardslee et al. | 717/124 |
| 2007/0088537 A1* | 4/2007 | Lertora et al. | 703/28 |
| 2007/0162247 A1* | 7/2007 | Reblewski | 702/119 |
| 2007/0210336 A1* | 9/2007 | Madurawe | 257/209 |
| 2009/0128699 A1* | 5/2009 | Nagakura et al. | 348/553 |
| 2010/0146338 A1* | 6/2010 | Schalick et al. | 714/33 |
| 2011/0113399 A1* | 5/2011 | Vujkovic et al. | 716/129 |
| 2012/0216091 A1* | 8/2012 | Blostic et al. | 714/741 |
| 2013/0311961 A1* | 11/2013 | Madurawe | 716/103 |

OTHER PUBLICATIONS

Korean Intellectual Property Office, International Search Report and Written Opinion issued on May 7, 2012 for corresponding International Patent Application No. PCT/US2011/054096 (pp. 1-10) with claims searched (pp. 11-21) pp. 1-21.

* cited by examiner

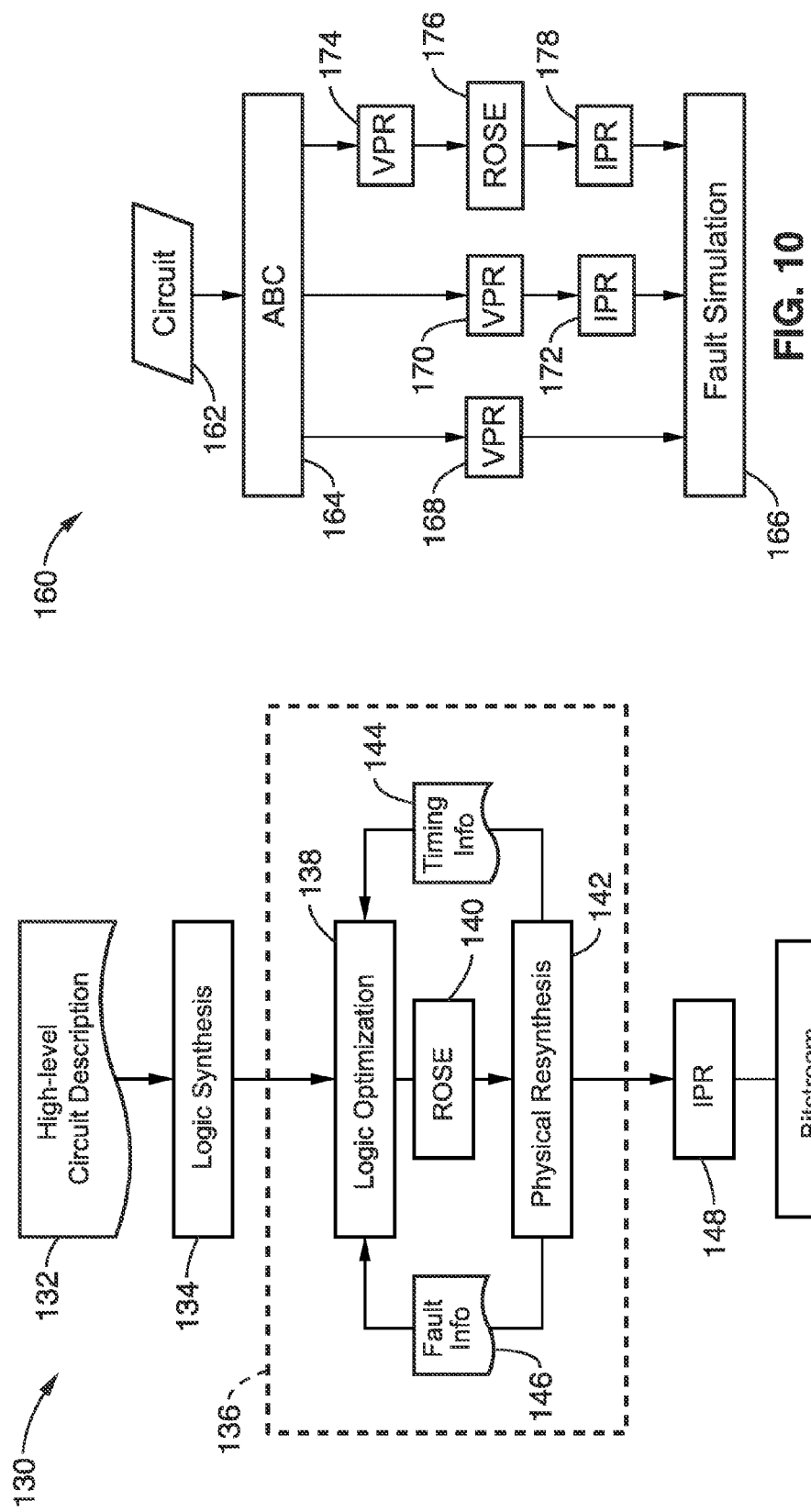

IN-PLACE RESYNTHESIS AND REMAPPING TECHNIQUES FOR SOFT ERROR MITIGATION IN FPGA

CROSS-REFERENCE TO RELATED APPLICATIONS

This application is a 35 U.S.C. §111(a) continuation of PCT international application number PCT/US2011/054096 filed on Sep. 29, 2011, incorporated herein by reference in its entirety, which is a nonprovisional patent application Ser. No. 61/387,572 filed on Sep. 29, 2010, incorporated herein by reference in its entirety, a nonprovisional of U.S. provisional patent application Ser. No. 61/409,081 filed on Nov. 1, 2010, incorporated herein by reference in its entirety, and a nonprovisional of U.S. provisional patent application Ser. No. 61/487,133 filed on May 17, 2011, incorporated herein by reference in its entirety.

The above-referenced PCT international application was published as PCT International Publication No. WO 2012/047735 on Apr. 12, 2012 and republished on Jun. 28, 2012, and is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to FPGA resynthesis and remapping and more particularly to in-place resynthesis and remapping techniques for soft error mitigation in FPGAs.

2. Description of Related Art

Modern FPGAs use ever advancing fabrication technologies to achieve higher density at reduced power consumption levels, but at the cost of more vulnerability to a single event upset (SEU), such as caused by supply voltage fluctuations, electromagnetic coupling and environmental radiation. Since an FPGA utilizes memory cells (primarily static random access memory (SRAM)) to implement logic functions and interconnects, the occurrence of a SEU can lead to a permanent impact on the logic function and interconnect, which can only be resolved by reprogramming the FPGA. Although this is not a critical concern for FPGAs used in prototypes, it is an issue that must be addressed when FPGAs are utilized in various system implementations, such as within internet router devices, or other applications which require low failure rates.

In view of the increasing number of FPGA chips which are utilized in deployed systems ranging from internet line cards to enterprise servers, robustness is among the most important design objectives for new FPGA designs. Moreover, while robustness needs to be researched for different design stages of FPGA-based systems, there is also a need for logic design and synthesis that explicitly accounts for and tolerates faults including soft errors.

Robustness in FPGAs has been extensively studied in the literature. Specific FPGA architectures have been developed such as radiation hardened FPGAs from Xilinx and anti-fuse based FPGAs from Actel. Circuit redundancy such as triple modular redundancy (TMR) and quadruple modular redundancy (QMR) have also been proposed.

However, the aforementioned FPGA techniques are accompanied by high overheads in relation to cost, area and/or power, typically with three-times to six-times (~3× to ~6×) the amount of overhead in relation to timing, power, and area. The substantial overhead increases necessary to overcome SEUs often renders the devices impractical for use in non-mission critical applications such as communication systems.

Although SEU resilience of an FPGA decreases as fabrication geometry of device technology shrinks, due to lower voltage and smaller charging capacitance, the demand continues for increased logic density.

Accordingly, a need exists for fault tolerant techniques that effectively improves FPGA robustness FPGAs with minimal or no overhead. The present invention fulfills that need and others with minimal overhead impact.

BRIEF SUMMARY OF THE INVENTION

The present invention comprises methods and apparatus for performing in-place techniques on an FPGA to improve fault tolerance with respect to a single event upset (SEU). Four in-place SEU tolerant techniques, IPR, IPF, IPV, and IPD are described in the present invention which can be utilized separately or in combination with one another and other techniques known in the art. Of these mechanisms the IPR, IPF, and IPV are re-synthesis techniques which can be applied to any FPGA architecture, and have applicability to application specific integrated circuit (ASIC) design as well. The IPD elements are afterward described directed to FPGAs featuring multiple-output LUT architecture.

IPR: In-Place Reconfiguration

The present invention includes a fault tolerant mechanism described as an in-place reconfiguration, which is referred to herein as IPR, and is a logic re-synthesis technique. While LUTs (lookup table) are utilized to implement FPGAs, other programmable mechanisms such as PLA (programmable-logic array) can also be utilized, and are considered within the scope of this disclosure.

The atomic operation in IPR is to simultaneously reconfigure a group of LUTs, called a cone, in a placed and routed circuit without changing the placement and routing of LUTs within the cone, and without changing the functions or outputs of the cone. When the atomic operation is applied iteratively, it does not change the function and layout of a LUT-based combinational logic network. This iterative procedure can be applied to a sequential logic network by applying it independently to each combination logic block within the sequential logic network.

It will be appreciated that the order of applying the atomic IPR operation may affect the final optimization result. The order can be determined in a number of ways, such as decided based on a weighting factor (or criticality) computed from the optimization objectives, or it may be decided randomly, or utilizing other mechanisms or combinations thereof.

In an atomic IPR operation, Boolean matching can be utilized to find one or multiple reconfiguration solutions for LUTs within a cone. These reconfiguration solutions do not change the output functions of the cone, yet may provide different qualities in regards to the optimization objective. Boolean Satisfiability (SAT) is one of Boolean matching methods that can be used to find desired configuration options.

The in-place LUT reconfiguration described herein can be used for increasing fault tolerance of FPGAs by maximizing identical configuration bits corresponding to complementary inputs of a LUT. In this way, transient or permanent faults seen at a pair of complementary inputs have less possibility of propagation, and the overall reliability of the circuit is optimized.

Another type of atomic IPR embodiment provides additional flexibility in that it reserves placement of LUTs in a cone by reserving logic functions of cone outputs, and allowing re-routing between LUTs within the cone while not allowing placement and routing changes for LUTs outside the cone.

IPF: In-Place X-Filling

The present invention includes a fault tolerance technique for in-place X-filling, which is referred to as IPF. By exploiting existing "don't-cares" (DCs) to mitigate soft errors in SRAM-based FPGAs, which determine states of DC bits to mask soft errors in their fan-in cones to improve the reliability of the circuit.

It should be appreciated that the term "X-filling" has been borrowed from the field of power-aware Automatic Test Pattern Generation (ATPG), which by contrast to the present invention minimizes power by filling DCs to minimize logic switching of circuits under test.

However, the IPF technique of the present invention exploits "satisfiability don't cares" (SDCs) for SEUs mitigation. It should be appreciated that SDCs are one kind of DCs and a majority of the DC set, such as comprising about 90% of the DC set. SDCs are compatible DCs, that is a state change of an SDC bit does not invalidate other DC bits. Under normal situations, all SDC bits in LUTs are inaccessible. However, when soft errors occur in their fan-in cones, SDC bits might be chosen. The in-place X-filling (IPF) performed according to the invention assigns the SDC bit to the logic value that maximizes the possibility for a LUT to output the right logic. IPF does not change the functionality or the topology of the original LUT netlist.

Soft errors in the fan-in cones can arise either from LUT configuration RAM (CRAM) bits or interconnect CRAM bits. As a result, IPF improves not only the reliability of LUTs, but also mitigates SEUs on interconnects effectively, which has more impact on reliability at the chip level. IPF is also an efficient technique which does not demand a time-consuming binary decision diagram (BDD), Boolean satisfiability (SAT) or integer linear programming (ILP) to search for the functionally equivalent reconfiguration. In the testing performed for the present invention, the windowing technique was applied to calculate SDCs of all LUTs. Furthermore, the optimization process was found to converge quickly, usually in less than three (3) iterations. The use of IPF can preserve the topology of the netlist, and therefore it is an in-place synthesis which provides for quick design closure.

IPV: In-Place Inversion

The present invention includes an in-place LUT inversion technique referred to as IPV. Configuration bits in the RAM memory of an FPGA consist of bits referred to as "CRAM" bits in LUTs and those used in routing or interconnects. When an SEU occurs on a LUT CRAM bit, it changes the truth table of the LUT. On the other hand, modern FPGAs use unidirectional routing architecture, which is mainly composed of programmable interconnect points (PIP). When an SEU occurs on a routing CRAM bit, it may result in changing the driver of a net or bridging two nets with different drivers together. The impact of these SEU induced faults depends on the signal discrepancy on the nets involved in driver switching or bridging due to SEU. The present invention inverts polarities of logic functions (implemented by LUTs) to reduce the fault impact such as resultant soft error rate (SER).

The present logic invention contains two atomic operations: driving logic polarity inversion and driven logic adjustment. The polarity inversion operation inverts the function of the driving logic. The driven logic adjustment operation modifies the logic functions of the fan-out LUTs to preserve the functionality affected by polarity inversion. When the two operations are applied, the soft error rate can be reduced by decreasing the signal discrepancy among nets without changing the functionality of LUT netlist.

By modifying the optimization objective, the present invention can also reduce the crosstalk effect between interconnects. Then, signal integrity, power consumption, and performance can be improved.

IPV is also capable of balancing or biasing the probability of logic "0" and logic "1" in the circuit, in response to inversion of logic polarities within the LUTs.

Common Elements of IPR, IPF, IPV:

IPR, IPF, and IPV perform logic transformation while preserving the function and layout of the LUT-based logic network. No specific routing architecture is required according to the present invention, which changes only the truth table of the LUTs. These mechanisms can all be applied to post routed circuits, and they don't require changing or resynthesizing placement and routing, nor do they require redoing physical design, wherein design closure is more readily obtained.

IPR, IPF, and IPV techniques according to the invention can be utilized for minimizing leakage power, because leakage power of a LUT depends on how the LUT is configured. Compared to re-configuring a single LUT, reconfiguration of multiple LUTs simultaneously can provide significantly larger reductions in power consumption.

IPR, IPF, and IPV techniques according to the invention provide for reduced delay, because it may change which paths may be sensitized by valid input vectors and therefore change the critical delay of a circuit.

Similar to FPGA, certain types of ASIC designs apply mask programmability to implement logic. Examples include VPGA (via programmable gate array) where mask-programmable vias serve the same programmable functionality as field programmable bits in a LUT of an FPGA. The present invention is applicable FPGA and similar device designs, such as VPGAs, other programmable devices and to less particularly to ASIC designs.

A self-evolutionary FPGA-based system can be built using IPR, IPF, and/or IPV running on a computer to pass a new-configuration to the FPGA-based system. Simple software or control logic can be added to measure the system in terms of the optimization objective, and to decide whether the new-configuration is accepted without re-doing any placement or routing of the FPGA. This type of self-evolution can be more accurate and more efficient compared to purely software-based resynthesis.

To measure fault tolerance, fault injection can be implemented in combination with dynamic reconfiguration tools that allow the FPGA user to "precisely" flip (or change the value of) a configuration bit (in both LUT configuration or interconnect) of an FPGA.

Alternatively, the FPGA user may use the block RAM to implement (replace) the configuration bits in an FPGA. This approach allows the FPGA user to control the mapping between configuration bits in a logic-level netlist and those in the physical layout, without using the aforementioned precise dynamic reconfiguration feature of an FPGA.

IPD: In-Place Decomposition

The present invention includes an in-place decomposition technique referred to as IPD. It will be appreciated that state-of-the-art FPGAs, including Xilinx Vertix-5 and Altera Stratix-IV, utilize dual-output LUTs, in which each LUT under consideration composes two or more smaller LUTs and a second output pin is provided. In addition, a carry-chain (or adder) is provided within the same programmable-logic block (PLB), or configurable logic block (CLB). For the sake of simplicity of discussion, the term PLB will be utilized hereafter, although the teachings apply to CLBs and other nomenclature for modifiable logic blocks. The IPD technique of the invention decomposes a logic function into two or more subfunctions that can be implemented by the dual-output LUT which are then combined by the carry-chain (converging logic) within the same PLB.

The present invention provides two atomic operations of decomposition and converging. The decomposition operation transforms a logic function into two or more subfunctions, then the converging operation combines the decomposed subfunctions. When the two operations are applied, the circuit redundancies are created by the decomposed subfunctions and the logic masking is provided by the converging logic to improve the robustness of the circuit.

The present invention utilizes the dual-output feature of these state-of-the-art LUT architectures to perform decomposition. Decomposition transforms the original function mapped on a dual-output LUT into two subfunctions by utilizing the unused second output. Since the decomposition operation is completed inside a dual-output LUT, the placement and the total number of LUTs can be preserved.

The converging operation can be achieved by encoding the converging logic to the fanout LUTs of a decomposed LUT. When a fanout LUT has an unused input pin, the decomposed subfunction at the second output of a dual-output LUT can be connected to the unused input pin, and the masking logic is encoded into the fanout LUT while preserving the functionality.

When each of the fanout LUTs of a decomposed LUT has at least one unused input pin, the fully-masked decomposition technique can be applied, where all of the fanout LUTs are connected to the decomposed subfunctions and the converging logic can be implemented (or encoded) by the fanout LUTs. Otherwise, the partially-masked decomposition can be applied where at least one of the fanout LUTs has an unused input pin and performed the aforementioned encoding.

The converging logic can be implemented by built-in hard macros, such as built-in carry chains or adders within a programmable-logic block (PLB). When both decomposition and converging are applied inside the same PLB, it is considered "in-place decomposition", because both decomposition and converging of a function are completed inside the same PLB and the PLB-level placement and routing is preserved. Therefore, there is no need to perform physical re-synthesis after decomposition and converging, and results in fast design closure. In addition, when the hard macros in the same PLB are already being used, the present invention can find and utilize otherwise unused hard macros located at different PLBs to implement converging logic with minimized timing and area overhead.

The present invention provides a number of beneficial elements which can be implemented either separately or in any desired combination without departing from the present teachings.

Further aspects and embodiments of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 9 is a flowchart of synthesis and resynthesis flow utilizing in-place reconfiguration (IPR) for an FPGA according to an embodiment of the present invention.

FIG. 10 is a schematic of experimental flows between ABC and fault simulation, showing the use of in-place reconfiguration (IPR) according to an embodiment of the present invention.

DETAILED DESCRIPTION OF THE INVENTION

The details of IPR (in-place reconfiguration), IPF (in-place X-filling), IPV (in-place inversion), and IPD (in-place decomposition), are described in detail in the following sections. It should be appreciated that these techniques can be applied separately or in any desired combination without departing from the teachings of the present invention.

Figure 1:
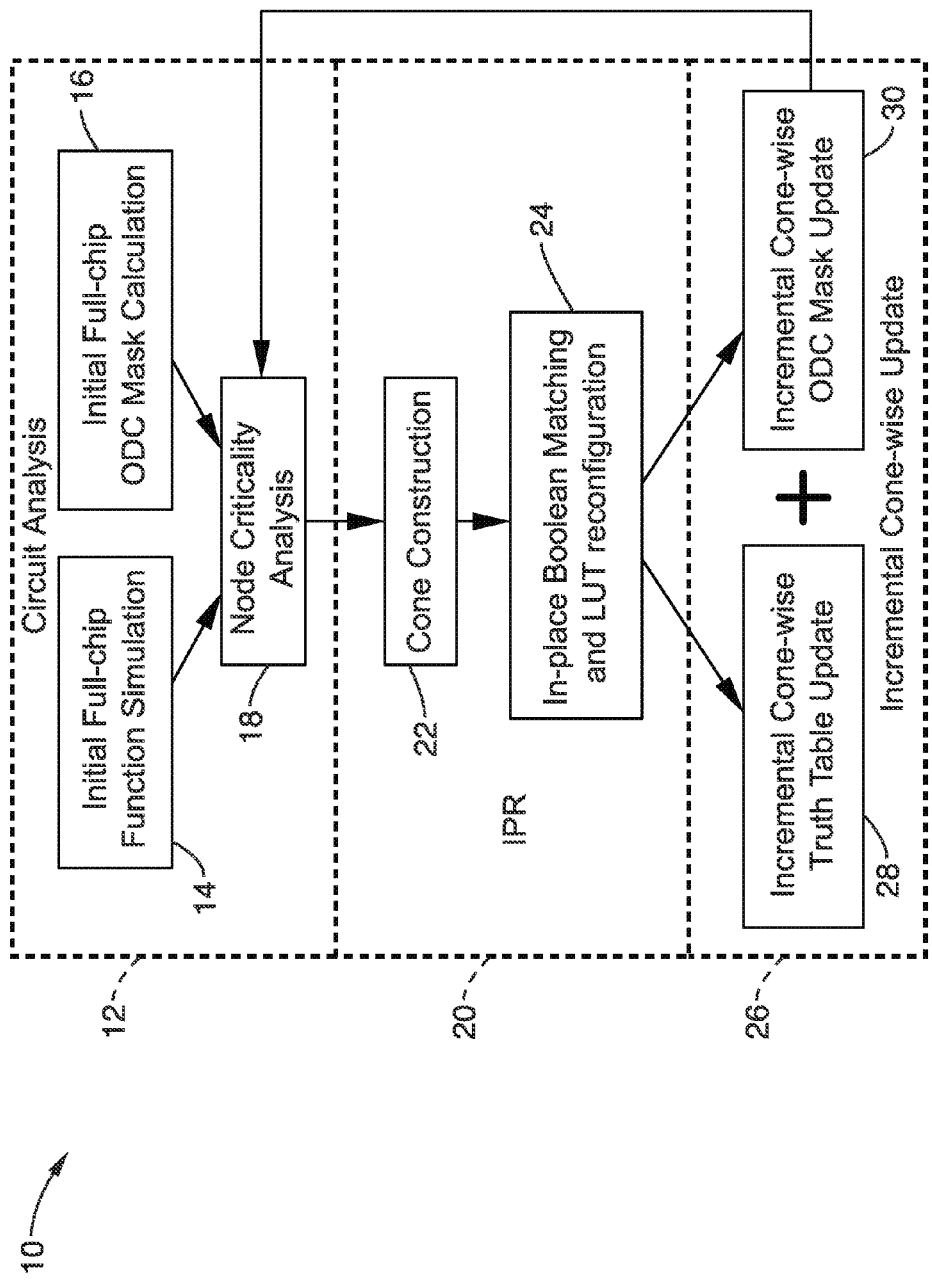
FIG. 1 is a flow diagram for in-place reconfiguration (IPR) according to an embodiment of the present invention.

IPR (In-Place Reconfiguration):

FIG. 1 illustrates an example embodiment 10 of the overall flow of in-place reconfiguration for FPGA circuit. It should be appreciated that a via-programmable gate array (VPGA) is considered herein to be a special case of an FPGA, while the technique is also applicable to other programmable circuit designs, and to some extent application specific integrated circuits (ASICs). Firstly, a circuit analysis 12 is performed, which depending on the optimization objective can incorporate different forms of analysis. In one embodiment, fault tolerance is enhanced by performing circuit analysis to include full-chip functional simulation 14 and the observability don't-care (ODC) masking calculation 16, as seen in the figure.

After the circuit analysis is performed, multiple iterations of in-place reconfiguration (IPR) are performed 20. In each of these iterations, a group of LUTs (or a cone) is selected (constructed) 22 as a sub-network. The selection of the group of LUTs can be a weight (or criticality) computed based on the optimization objectives or randomly. The order of the iterative reconfiguration can be topological, reverse topological, random, or other pattern as desired.

For the above sub-network selection to be reconfigured, the configuration bits of the LUTs included are changed in a way to maximize the specified optimization objectives, including fault tolerance, power reduction and timing optimization. Boolean matching 24 can be utilized to find the suited reconfiguration solutions for certain optimization objectives. Boolean Satisfiability can be used to perform the search of the desired configuration options.

When the LUT reconfiguration for each cone is finished, the circuit information needs to be updated 26. Different forms of circuit update can be performed depending on the objective. For example, in the embodiment shown fault tolerance is optimized by incremental updates to the logic functions (truth table) 28 and updating ODC masking 30 need to be updated. The update can be performed in each iteration to cover all changed circuit parts, or only made to selected local parts. Otherwise, it can be performed to update the full circuit after a few iterations instead of every single iteration to reduce runtime.

Figure 2:
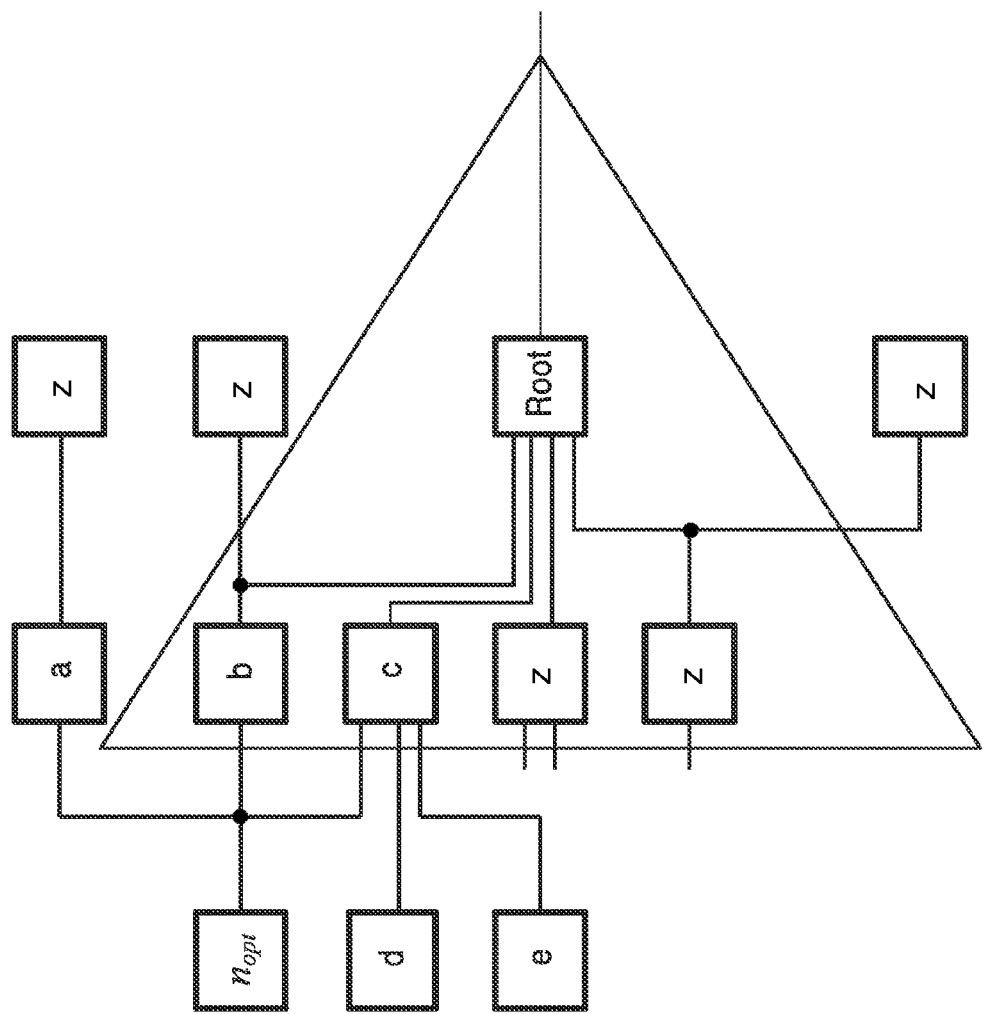
FIG. 2 is a schematic of selecting a group of LUTs (cone) for reconfiguration according to an embodiment of the present invention.

FIG. 2 illustrates an example of selecting a group of LUTs for reconfiguration. Specifically, a critical LUT is first selected (Denoted as LUT $\eta_{opt}$ in FIG. 2), where the criticality of a LUT is defined based on its impact to the full circuit for certain objectives under consideration (e.g., fault tolerance, power or timing). The critical $\eta_{opt}$ LUT is shown in relation to nearby LUTs a, b, c, d, e, and Root, and shown in relation to neighboring LUTs z, which are not specifically discussed. For example, the criticality of a LUT considering fault tolerance can be defined based on the ODC masking and its signal probability (i.e., the probability of signal being logic 1 under a given sequence of primary input vectors). It should be noted that the selection applies first to the critical LUT and generally to a group or cone of LUTs, and more generally to all the LUTs, as criticality can be dealt with to any desired extent according to the invention.

When the critical LUT is selected, all combinations of its fanouts are examined. In FIG. 2, as an example, fanouts b and c of LUT $\eta_{opt}$ are examined as one of these combinations. The closest single node dominator of these fanouts is then selected, where the single node dominator of a group of nodes means that all nodes in this group are inside the transitive fan-in cone of the dominator. In FIG. 2, the closest single node dominator of b and c is shown as 'Root'. The selected group of LUTs for reconfiguration includes all level-1 fan-ins of Root and uses the fanout nodes of the critical LUT as the boundary, for example the shaded area denotes the selected cone.

Figure 3A:
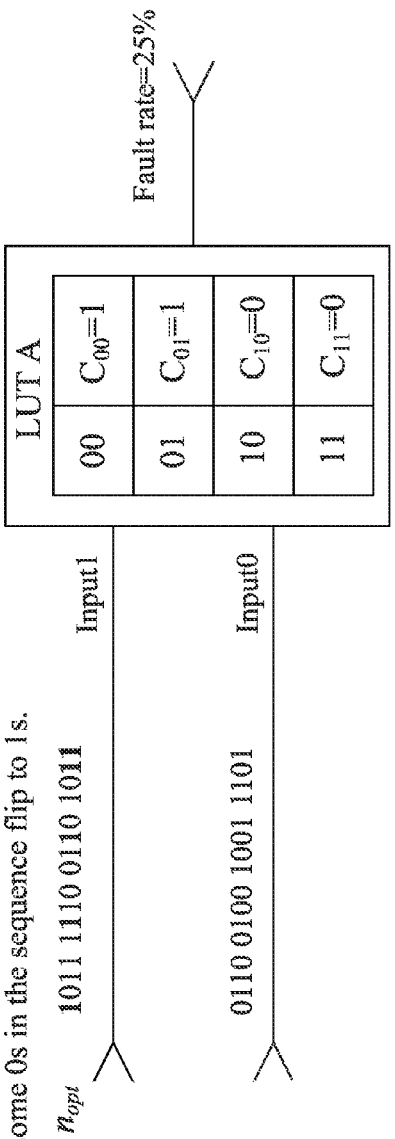
FIG. 3A through FIG. 3B are block diagrams of in-place reconfiguration (IPR) for fault tolerance according to an embodiment of the present invention.
Figure 3B:
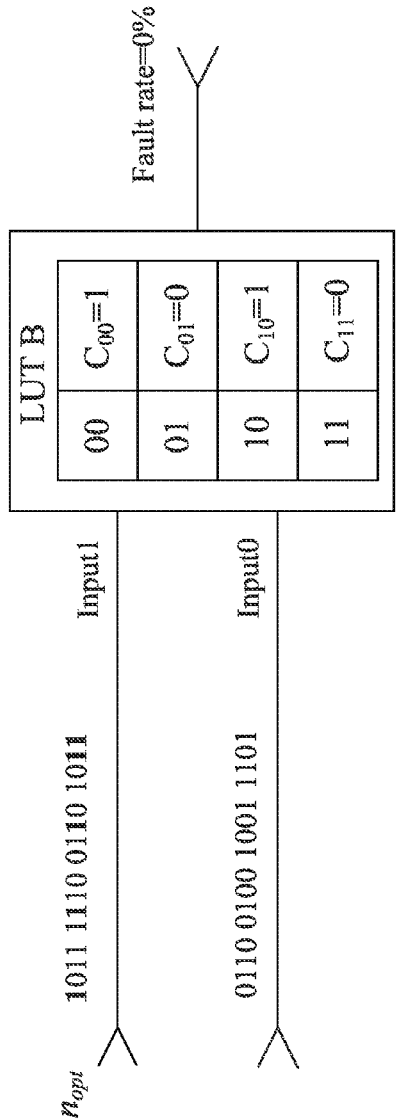

FIG. 3A through FIG. 3B illustrate the essence of in-place reconfiguration for fault tolerance in a 2-LUT. The following description of LUT concepts are frequently utilized in the present invention. An input vector of a LUT has a logic output specified by a configuration bit. For example in a 4-LUT, input vector 0011 generates logic output 0 if the configuration bit c0011 is 0. More generally, for an input pin i, a K-LUT has 2K–1 pairs of configuration bits associated with it. For example in a 2-LUT, both pair (c00, c10), and pair (c01, c11) are configuration bits associated with input pin 1. In the remaining description, without specific declaration, the node under optimization is referred to as $\eta_{opt}$, and pairs of configuration bits refer to the ones in the fanout LUT driven by $\eta_{opt}$.

When a fault happens to $\eta_{opt}$, bits in this sequence are flipped, for example making some logic 0s in the output of the $\eta_{opt}$ sequence flip to logic 1s. In the example shown FIG. 3A, LUT A cannot tolerate any fault, while LUT B of FIG. 3B can tolerate all single faults because its configuration pairs (c00, c10) and (c01, c11) are the same within each pair. A pair of configuration bits with the same configuration value are called a symmetric pair of configuration. Therefore, to reduce fault propagation from $\eta_{opt}$, the number of symmetric pairs of configurations in the fanout of $\eta_{opt}$ should be increased. However, such reconfiguring most likely changes the function of a LUT. Yet, according to the invention, multiple LUTs can be reconfigured simultaneously to maximize the number of symmetric pairs, while at the same time preserving the functions and topology of the LUT-based logic network.

Figure 4:
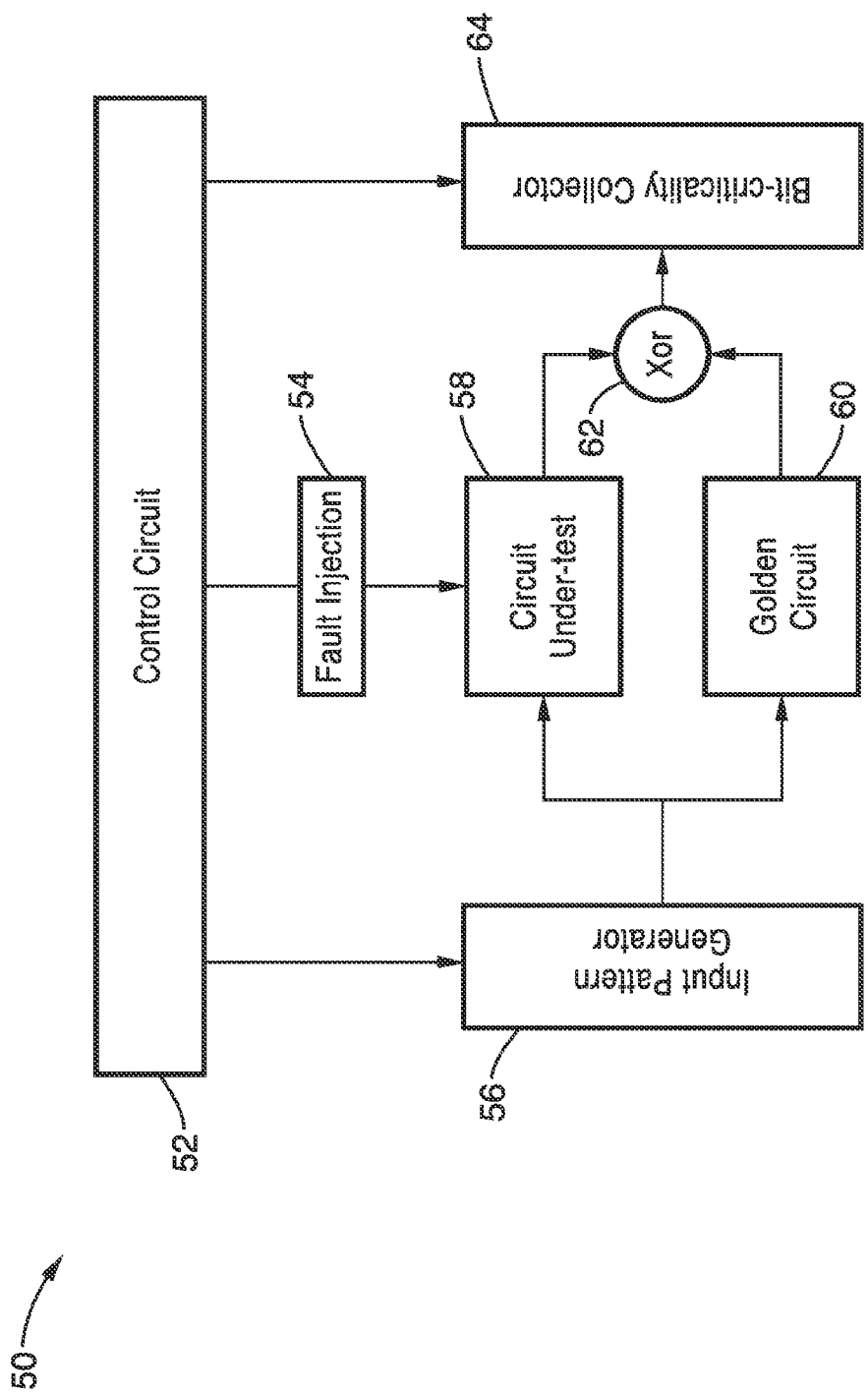
FIG. 4 is a block diagram of an FPGA fault analysis emulator utilized according to an embodiment of the present invention.

FIG. 4 illustrates an example architecture embodiment 50 of an FPGA-based emulator which provides efficient fault analysis. The emulator can be utilized during the circuit analysis (block 18 in FIG. 1) for efficient criticality computation and/or for full-chip evaluation. In addition, the emulator can be interfaced to a computer aided design (CAD) tool for interacting with the inventive in-place reconfiguration to provide information with increased accuracy, such as power estimation, fault injection and/or testing. Control logic 52 is coupled for controlling the activity in the circuit elements and performing fault injection 54. Considering fault tolerance, in particular, patterns are generated 56 for a circuit under test (CUT) 58 and golden circuit (reference) 60, while the global controller injects faults 54 to the CUT. The CUT output is checked against the golden circuit (reference circuit) 62, exemplified as an exclusive-OR circuit (XOR). The output bit-criticality controller 64 counts the mismatches and computes the criticality of full-chip fault rate.

If a testing dictionary is available for both input and output, a fault can be injected to the first copy of the circuit such that the output with fault injected can be compared to the correct output from a second copy of the circuit (reference circuit with no fault injection) to decide whether the fault can be tolerated.

The use of IPR can reduce both dynamic and leakage power. For dynamic power reduction, IPR can be used to reduce switching possibilities of involved LUTs and interconnects driven by them.

Figure 5A:
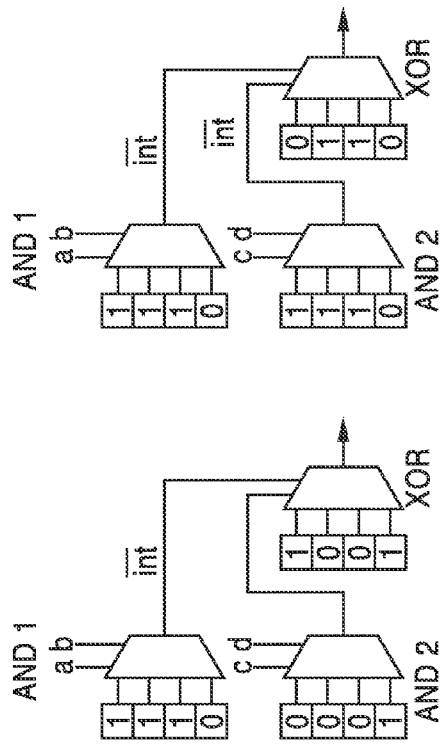
FIG. 5A through FIG. 5D are schematics of in-place reconfiguration (IPR) according to an embodiment of the present invention, shown for reducing leakage current.
Figure 5B:
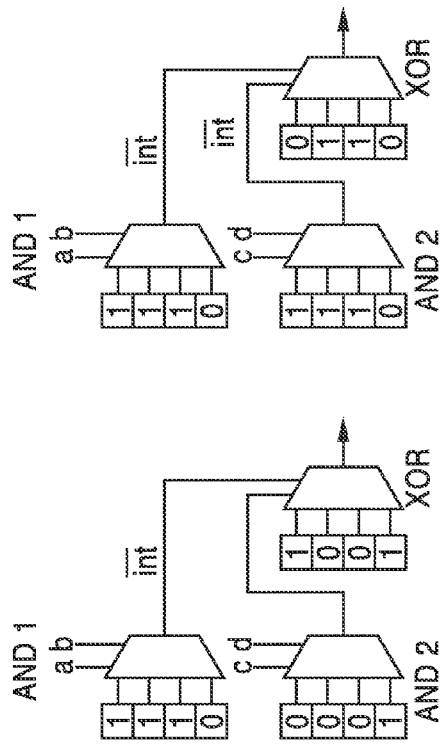
Figure 5C:
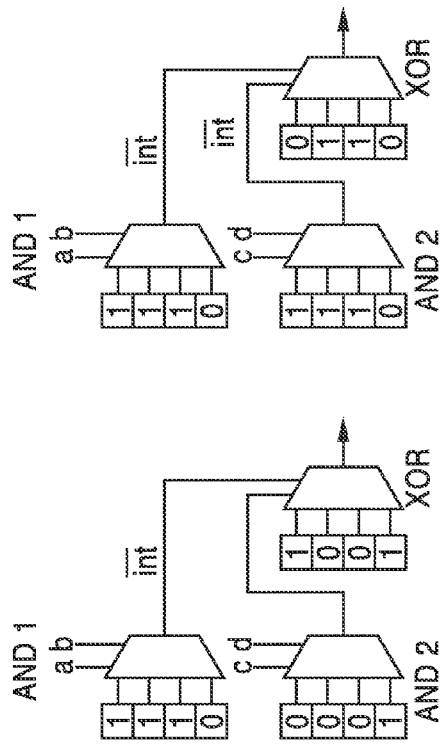
Figure 5D:
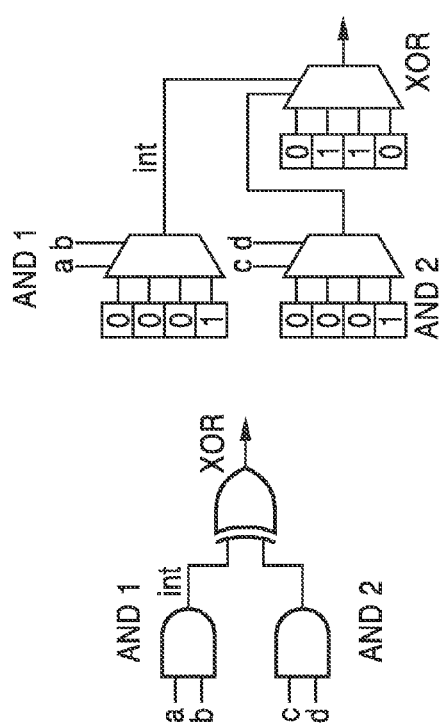

FIG. 5A through FIG. 5D illustrates how IPR can be applied to reduce leakage power for FPGAs. It has been determined that in a modern commercial CMOS process, leakage power dissipated by elementary FPGA hardware structures, namely buffers and multiplexers, is typically smaller when the output and input of these structures is logic 1 instead of logic 0. Therefore, to minimize leakage power, it is preferable to maximize the signal probability of logic 1, which is a specific case of a preferred logic polarity. In FIG. 5A, a logic function f=ab XOR cd is shown represented by a pair of two-input AND gates feeding into a two-input XOR gate. This structure is shown in FIG. 5B implemented in 2-input LUTs. Supposing the signal probability is equal for the interconnect, the more logic 1s that exist for LUT configuration bits will result in less leakage power consumed by the circuit. Using the signal polarity inversion for a single LUT one can obtain a functional equivalent implementation as shown in FIG. 5C, where the logic function of the LUT with inputs a and b is inversed and its fanout LUT is changed accordingly to ensure the logic equivalence for the overall circuit. In previous systems, the change of polarity was limited to a single LUT in each optimization iteration, however, in IPR polarity of a group of LUTs in a cone is changed which results in the implementation shown in FIG. 5D, which contains the maximal number of logic 1's in LUT configuration, and therefore has the least leakage power.

Figure 6A:
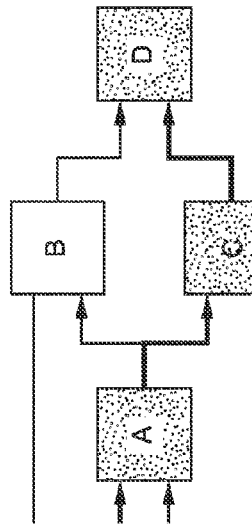
FIG. 6A through FIG. 6B are schematics of critical path in relation to a cone after in-place reconfiguration (IPR) according to an embodiment of the present invention.
Figure 6B:
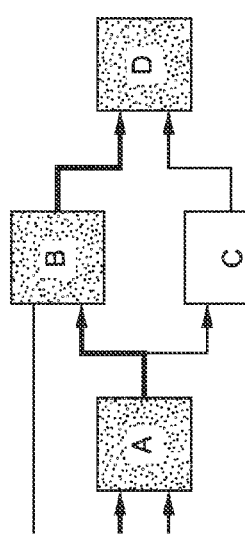

FIG. 6A through FIG. 6B illustrate an example within a cone, wherein a critical path can no longer be active after IPR. Before IPR in FIG. 6A, the critical path goes through LUT A, B and D as highlighted by the bold edges and shaded rectangles, and not through LUT C. After IPR in FIG. 6B, suppose the output of LUT A becomes a logic don't-care of the output of LUT D, and therefore the A→B→D path cannot be sensitized, that is to say that the path is no longer critical.

Figure 7:
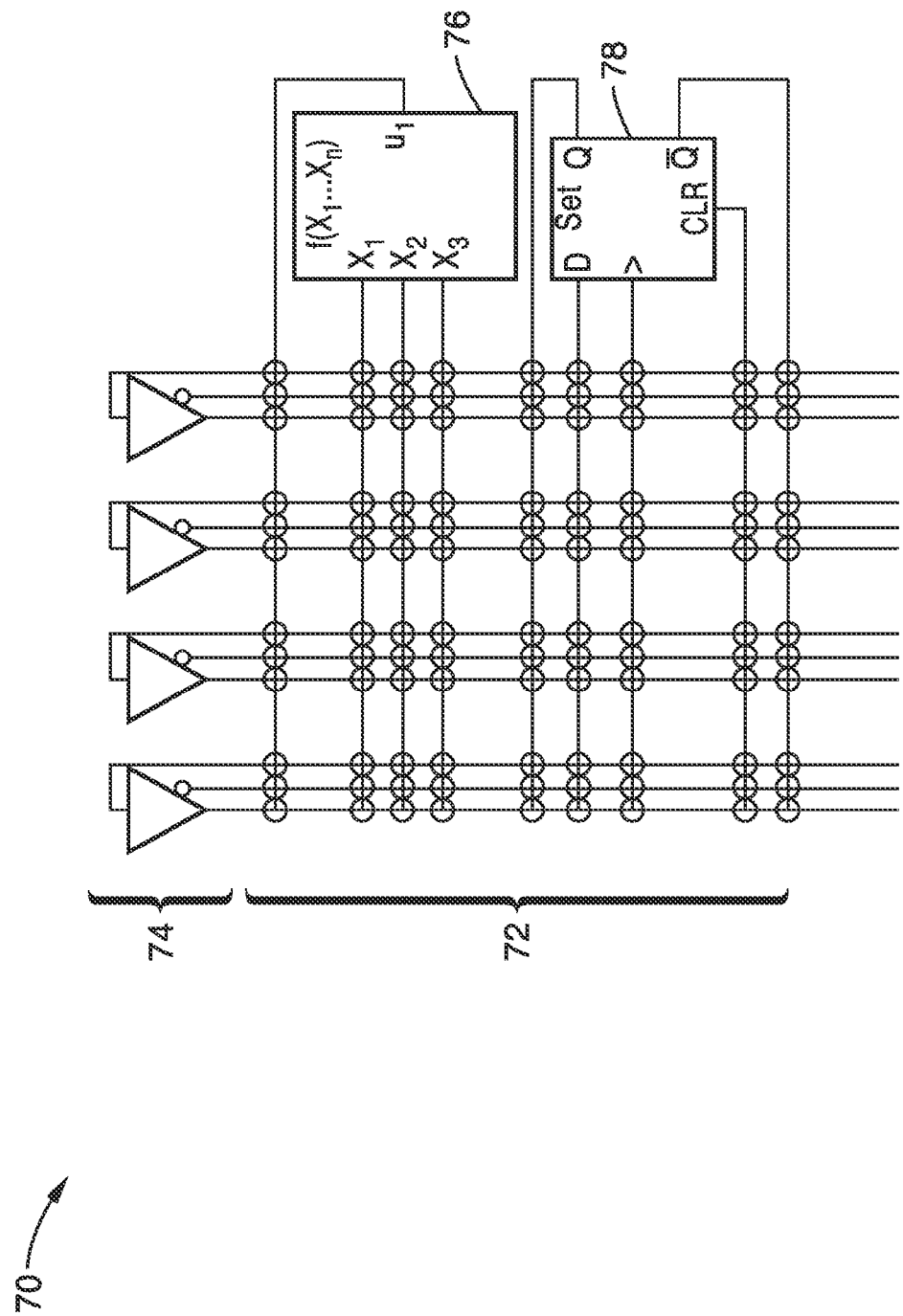
FIG. 7 is a schematic of a clustered logic block (CLB) for a via-programmable gate array upon which in-place reconfiguration (IPR) can be applied according to an embodiment of the present invention.

FIG. 7 illustrates an example embodiment 70 of a clustered logic block (CLB) for a via-programmable gate array (VPGA). It should be appreciated that adding or removing a via is equivalent to setting a configuration bit to 1 or 0. Therefore, IPR algorithms can be applied to VPGA without any changes. A via matrix 72 is shown driven by drivers 74, with inputs to a LUT 76 (e.g., three inputs $X_1$, $X_2$, and $X_3$, and output $u_1$) and a sequential circuit 78 (e.g., D-Flip-Flop having data in (D), set input (Set), clear input (CLR), clock input (">") and complementary outputs (Q and Q'). Outputs from the logic devices 76, 78 are directable back into matrix 72.

Figure 8A:
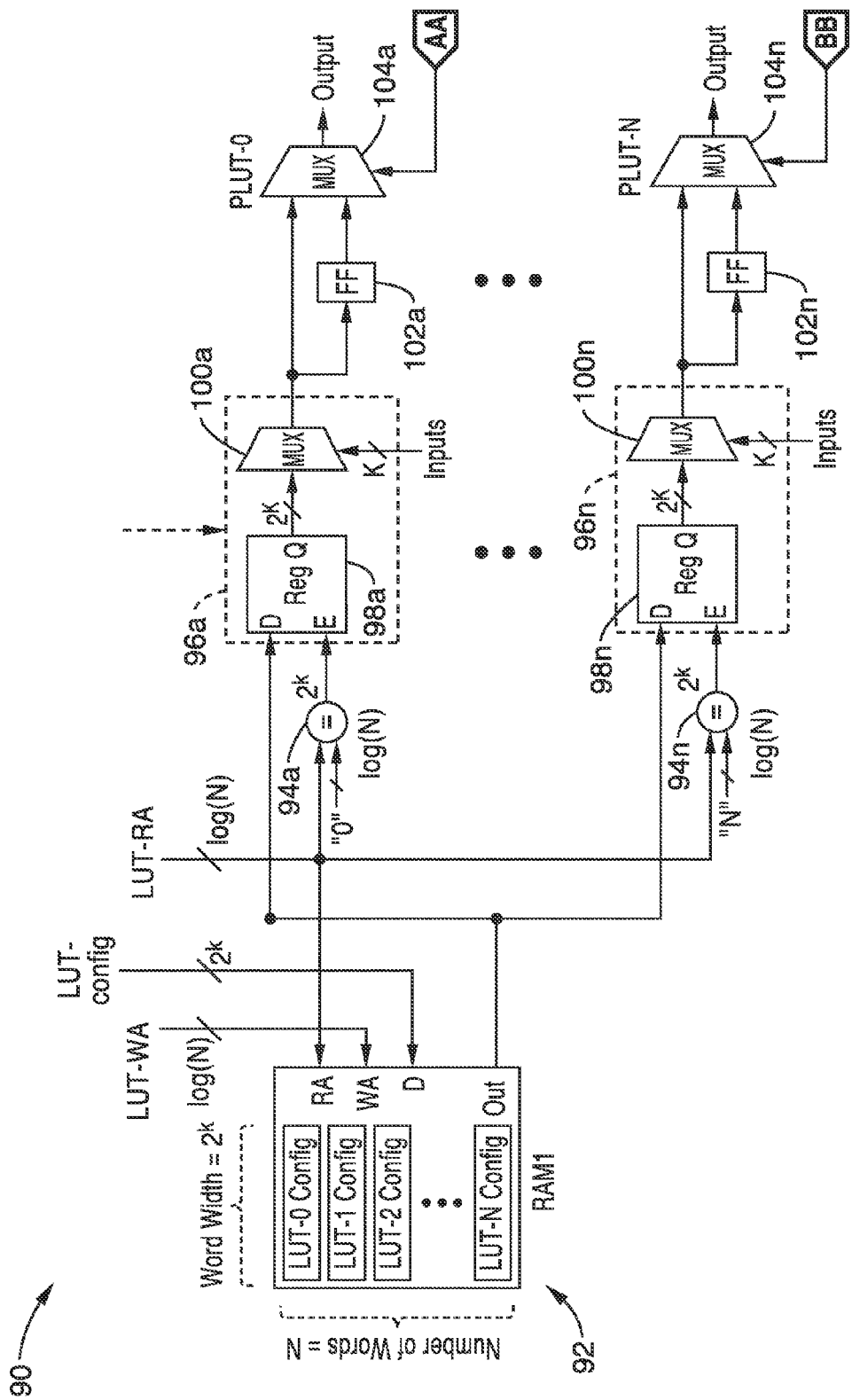
FIG. 8A through FIG. 8B is a schematic of a virtual-FPGA-based emulator for fault tolerance measurement for an FPGA utilizing in-place reconfiguration (IPR) according to an embodiment of the present invention.
Figure 8B:
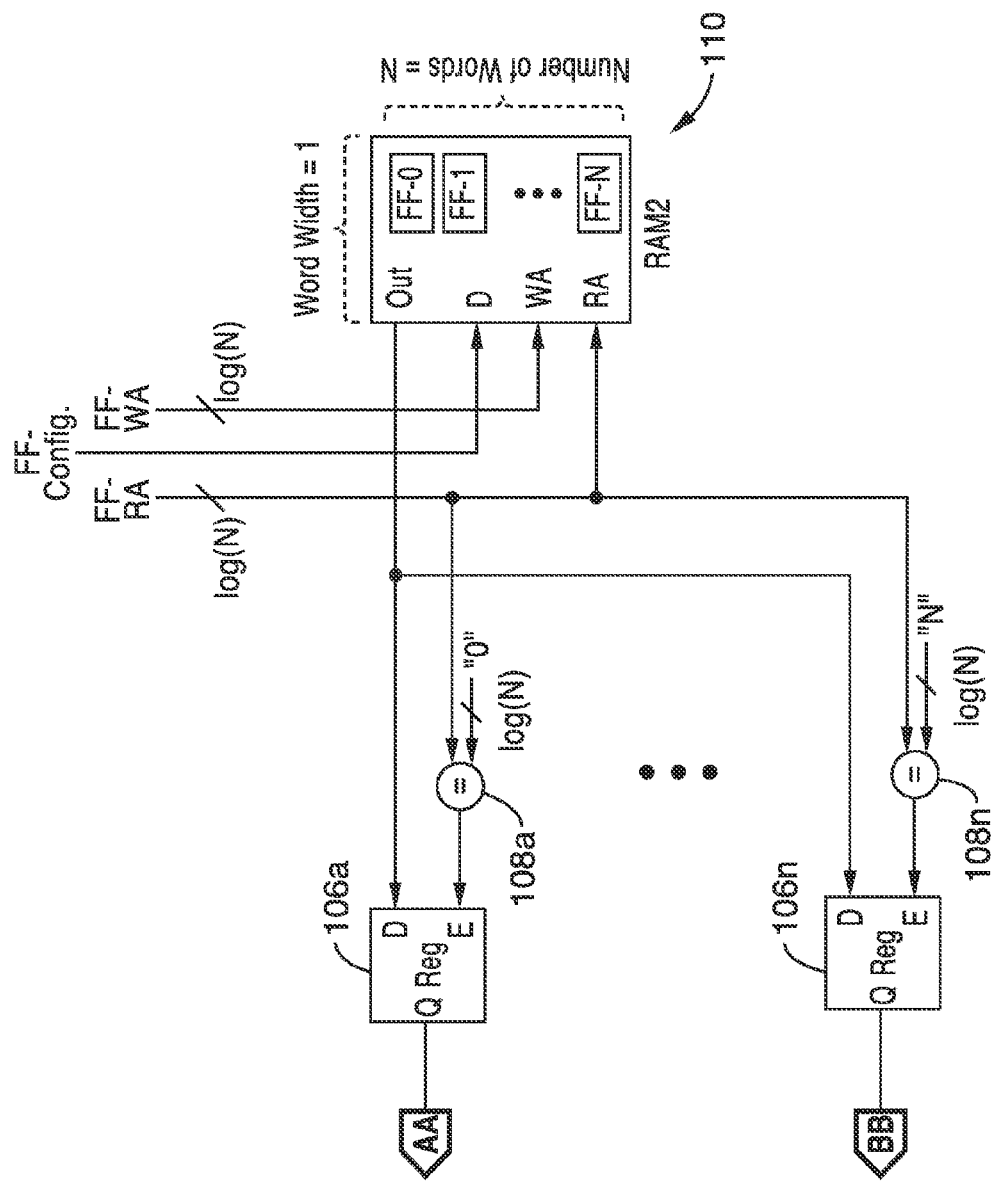

FIG. 8A through FIG. 8B illustrate an embodiment 90 of a virtual-FPGA-based emulator for fault tolerance measurement. This emulator uses the block RAM to implement configuration bits (or logically replace the configuration bits), so that one can directly inject faults in the block RAM to emulate a fault in a "real" configuration bit. In most cases, the FPGA user is able to control the content of the block RAM, but is not able to flip the configuration bit at a specific location for a LUT or an interconnect.

In FIG. 8A, a series of configuration LUTs 92 are shown coupled to summing junctions 94a through 94n, which along with output from LUTs 92 feeds registers 96a through 96n, which each contain a flip-flop 98a through 98n with inputs D and E and outputs Q which are received by multiplexors (MUXs) with K inputs 100a through 100n. Output from the multiplexors is delayed through flip-flops 102a through 102n and received by multiplexors 104a through 104n, receiving signals originating in FIG. 8B.

In FIG. 8B flip-flop registers 106a through 106n are shown which receive a signal from summing junctions 108a through 108n, in response to flip-flop configuration information FF-RA and a log(N) signal. A static memory device (RAM2) is shown for receiving signals FF-RA, FF-Config, and FF-WA to control its internal cells FF-0 through FF-N, while the device outputs (Out) back to the registers 106a through 106n.

FIG. 9 illustrates an example embodiment 130 of synthesis flow for FPGAs. A high level circuit description is made 132 following by logic synthesis according to any desired mechanism. An optimization process 136 is then shown comprising logic optimization 138, followed by way of example by the robust resynthesis algorithm (ROSE) and physical resynthesis 142, with feedback on timing in formation 144 and fault information 146 directed back to the logic optimization stage. Following these steps in-place reconfiguration (IPR) 148 is performed according to the present invention, from which a bitstream 150 is generated. It will be noted that logic optimization like ROSE is usually performed between logic synthesis and physical synthesis, while IPR is an in-place algorithm that can be performed after physical synthesis and before generating the bitstream.

In-place resynthesis is a technique that optimizes a circuit after the placement and routing while preserving the results of physical design. The inherent flexibility of FPGAs makes in-place resynthesis particularly useful for various optimizations of FPGAs. The algorithm described herein introduces logic masking in the circuit using in-place LUT reconfiguration that reconfigures multiple LUTs simultaneously.

A Boolean circuit after placement and routing is represented as a data-acquisition and generation map (DAG) with LUTs as nodes and interconnects as edges. Resynthesis starts with a full-chip simulation to compute the logic signature and observability don't-care (ODC) mask using any desired techniques. The ODC mask is utilized to compute the criticality of each LUT, which is defined as the percentage of ones in the ODC mask, which is used as a measure of the contribution of the LUT to the circuit fault rate. The LUT nodes are ordered in descending order of criticality. The algorithm iteratively selects the next LUT node in the ordering and tries to reduce its criticality as follows. For each selected node $\eta_{opt}$ a cone (i.e., a logic block that includes multiple LUTs) containing $\eta_{opt}$ is formed, and the LUTs inside the cone are reconfigured using an in-place Boolean matching that preserves both the logic function and the topology of the cone. The objective of the reconfiguration is maximizing the logic masking to prevent the propagation of faults. After each iteration, the logic signature and ODC mask are updated incrementally. The details of the algorithm are described further below.

In-place LUT reconfiguration is the key design freedom used for fault-tolerant resynthesis. As mentioned above, the "logic masking" is maximized in order to increase the robustness of a circuit with regard to faults. Specifically, the number of identical LUT configuration bits is maximized so that the faults originated upstream can be logically masked.

The logic output for an input vector of a LUT is specified by the configuration bit corresponding to the input, e.g., for 4-LUT, the input vector 0011 generates logic output 0 if the configuration bit c0011 is 0. Therefore, the input vector and the configuration bit have a one-to-one relationship. For an input pin i of a K-LUT, there are 2K−1 pairs of configuration bits associated with it, e.g., for a 2-LUT, the pairs (c00, c10) and (c01, c11) are pairs of configuration bits associated with input pin 1.

Referring back to FIG. 3A and FIG. 3B, consider the 2-LUTs shown as LUT A and LUT B with input sequences including critical LUT interconnect $\eta_{opt}$. As previously described, when a fault happens to $\eta_{opt}$, making some logic 0's in the output sequence of $\eta_{opt}$ flip to logic 1s, the output of LUT A changes, while the output of LUT B does not. This is because the configuration of LUT B pairs (c00, c10) and (c01, c11) each have the same logic outputs (1 for both c00, c10 and 0 for both c01, c11) while the output of LUT A does not. To reduce the propagation of faults from $\eta_{opt}$ there should be more identical pairs of configuration bits in a fanout LUT of $\eta_{opt}$. Naively, such reconfiguration typically changes the function of a LUT (indeed, LUTs A and B implement different functions). Yet, it may be possible to reconfigure multiple LUTs simultaneously to maximize the number of identical pairs and at the same time, preserve the functionality and topology of the LUT-based logic network.

Given the complementary inputs of a LUT, sometimes all the pairs of configuration bits may not be set as identical. Determining which pair of configuration bits are most beneficially set identical is a problem. Therefore, the criticality of configuration bits should be defined. High priority should be given to the configuration bits which can mask more faults after being set as identical. Suppose $N_{sequence}$ denotes the length of the sequence of input vectors used for full-chip functional simulation, $N_{vector}$ is the number of input vectors associated with the configuration bit c in the sequence, and $R_{tolerate}$ is the fraction of input vectors among the $N_{vector}$ input vectors for which the fault is not propagated to the primary output when the input of the LUT is defected. The value $R_{tolerate}$ can be derived from the ODC mask. Then $1-R_{tolerate}$ represents the fault rate gap that the immediate fanout can fill. The criticality of configuration bit c of a LUT n can be formulated as follows:

$$\text{Criticality\_bit}(c) = \frac{N_{vector}}{N_{sequence}} (1 - R_{tolerate}) \quad (1)$$

The above equation (Eq. 1) indicates that the more there is room for the immediate fanout to optimize, the higher its criticality is.

Given a cone CF constructed as described above, in-place Boolean matching (IP-BM) is performed to check if LUTs may be reconfigured within the cone and while maximizing identical pairs of configuration bits. It will be noted that a cone was previously represented in FIG. 2. If such a reconfiguration exists, IP-BM will return a set of feasible reconfigurations for all LUTs within the cone. Similar to the conventional Boolean matching, IP-BM preserves the logic function of the cone. In addition, IP-BM also preserves the topology of the cone, such as the interconnects among the LUTs within the cone which do not change after IP-BM.

IP-BM is based on the SAT-based Boolean matching techniques. Suppose the cone CF has m inputs $x_1, \ldots, x_m$ one output F, p LUTs: $L_0, \ldots, L_{p-1}$, and intermediate wires $z_1, \ldots, z_p$. From the cone CF, a Boolean formula $\Psi$ (CF) may be defined with free variables ranging over the configuration bits of the p LUTs such that a satisfying assignment to the formula (setting values to the configuration bits) ensures the topological structure and the functionality of the cone is preserved. To make a pair of configuration bits (ci, cj) in LUT L identical, they are conjoined with $\Psi$ (CF) with the extra constraint (ci⇔cj) which ensures (ci, cj) is identical.

The algorithm for IP-BM iteratively checks if $$\Psi(CF) \wedge \bigwedge_{(c_i, c_j) \in S_P} c_i \leftrightarrow c_j \quad (2)$$

can be satisfied for sets of pairs of configuration bits SP, which is initialized as all the pairs of configuration bits of all the LUTs in S, a subset of fanouts of $\eta_{opt}$. If Eq. 2 can be satisfied, then there exists a feasible reconfiguration of the cone such that all pairs of configuration bits in set SP can be set to identical values, and the configuration bits of LUTs can be obtained based on the satisfying assignment. Since the topology of the cone is constrained by the characteristic function, it is not changed after reconfiguration. If Eq. 2 is not satisfied, the size of set SP is reduced for the configuration bits toward making them identical, and solving the IP-BM with fewer constraints until either a solution is found or all combinations of LUT configurations have been tried.

IPR according to the invention has been implemented in C++ and miniSAT2.0 has been used as the satisfiability (SAT) solver. All experimental results were collected on a Ubuntu® workstation with 2.6 GHz Intel® Xeon® CPU having 2 GB of memory. The methods were tested using the Quartus University Interface Program (QUIP) benchmarks. All configuration bits are assumed to have an equal possibility to be defective during IPR optimization. For verification, the fault rate of the chip is the percentage of the primary input vectors that produce the defective outputs. The fault rate was calculated by Monte Carlo simulation with 20 k iterations where one bit fault is randomly injected in each iteration for 1 k input vectors.

FIG. 10 depicts a mapping 160 of testing benchmarks. A circuit is designed 162 subject to the testing. Each benchmark is first mapped 164, such as by the Berkeley ABC mapper for 4-LUTs, then synthesis is performed followed by fault simulation 166. Synthesis flows are shown in the figure as follows:

(1) versatile placement and routing (VPR) 168 without using any defect-oriented logic resynthesis according to the invention, (2) VPR synthesis 170 followed by in-place reconfiguration (IPR) 172, and (3) VPR synthesis 174, then ROSE (robust resynthesis algorithm) 176, and followed by in-place reconfiguration (IPR) 178. In each synthesis flow, the logic depth produced by ABC is preserved. It should be appreciated that ROSE can change the topology of the LUT-based logic network which limits its applicability. The number of configuration bits in the interconnects is extracted after the routing. Considering faults in configuration bits of both LUTs and interconnects, Monte Carlo simulation is performed to calculate the full-chip fault rate Table 1 contains experimental results for the above synthesis flows. It will be noted from these results that IPR provides 2×MTTF improvement compared to ABC, but there is no change in device area. Combining ROSE and IPR, there are both MTTF and area improvement compared to IPR only at the cost of losing the capability of in-place configuration.

IPF (In-Place X-Filling):

IPF is a resynthesis technique which decides states of SDC bits in LUTs to mask soft errors in their fan-in cones to improve the reliability of the circuit.

Figure 11B:
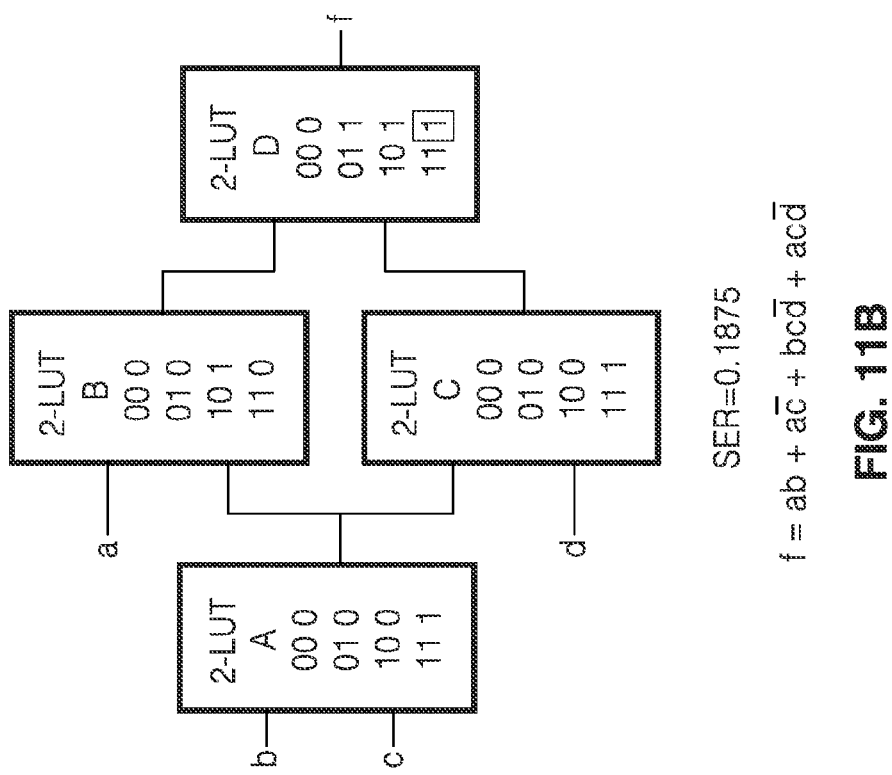
FIG. 11A through FIG. 11B are schematics exemplifying SER reduction after applying in-place X-filling (IPF) according to an embodiment of the present invention.
Figure 11A:
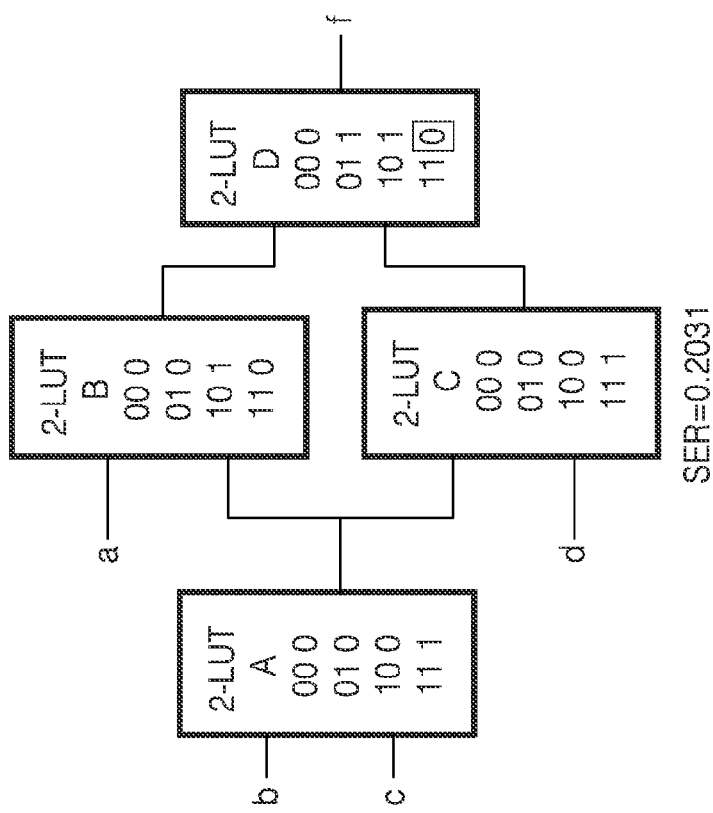

FIG. 11A through FIG. 11B illustrate an example embodiment of exploiting SDC to reduce soft error rate. As FIG. 11A illustrates, given a logic function f, there are two implementations with the same connectivity between LUTs. The f output differences are seen highlighted with boxes in the lower portion of the output LUTs. The CRAM bit $C_{11}$ in LUT D, with the box-highlighted 0 is the logic output for input 11, is an SDC bit which is inaccessible under normal situations. Therefore, the function of the circuit is the same no matter the output or state of $C_{11}$ is 0 or 1. Nevertheless, when the value is filled with 0 as shown in FIG. 11B the soft error rate is higher than when the value is assigned to 1. The reason is that, $C_{11}$ in LUT D may be accessed when a soft error occurs in the fan-in cone of LUT D; hence, when $C_{11}$ is filled with the same value as the one outputting more frequently or as that of the bit with highest criticality, even a soft error occurs, the error may be tolerated by LUT D.

Under normal situations, all SDC bits in LUTs are inaccessible. However, when soft errors occur in their fan-in cones, SDC bits might be chosen. The basic idea hidden behind the example is that a LUT can still output the correct value at most cases even an SDC bit is accessed due to a soft error. Therefore, the present technique is taught for soft error masking.

To reduce the soft error rate of a circuit, this element of the invention determined states of SDC bits in all LUTs to increase the likelihood of masking soft errors in their fan-in cones toward improving circuit reliability. First, the critical CRAM bits are identified, and SDC bits are also identified; then, SDC bits are assigned according to the priority of critical CRAM bits to mask soft errors. Since all the changes are performed by means of CRAM bit assignments, only the truth tables of LUTs are affected, and the circuit placement and routing structure can be preserved. Therefore, our proposed IPF is an in-place optimization technique and the cost on design closure is minimal.

Figure 12B:
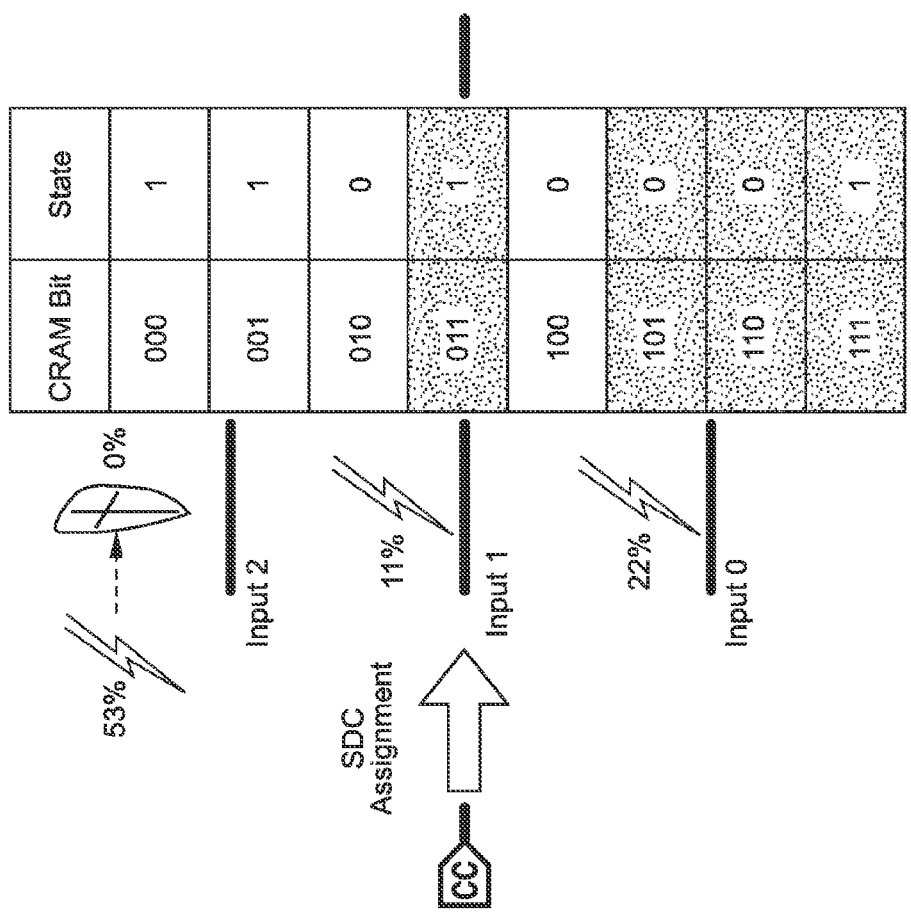
FIG. 12A through FIG. 12B are truth tables for a look-up table (LUT) upon which in-place X-filling (IPF) has been applied according to an embodiment of the present invention.
Figure 12A:
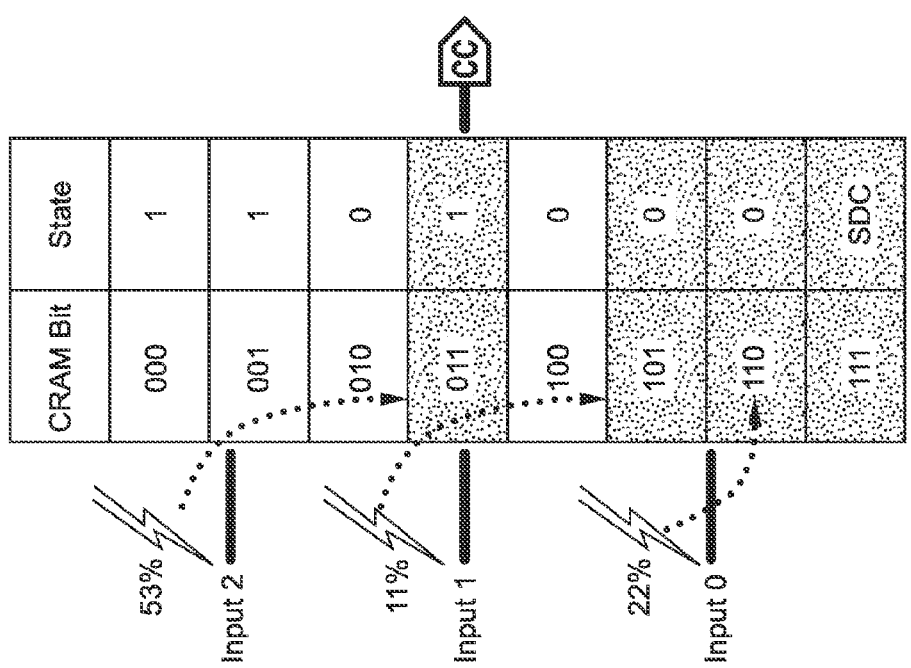

FIG. 12A through FIG. 12B illustrate a simple example of applying IPF and the attendant reduction in SER. For a 3-LUT as shown in the figures, suppose CRAM bit $C_{111}$ is an SDC bit. Hence, $C_{111}$ can be used to masking the soft error when $C_{011}$, $C_{101}$, or $C_{110}$ is supposed to be accessed. The access to $C_{011}$ is missed due to soft errors on Input 2, with a possibility of 53%. The access to $C_{101}$ is missed due to soft errors on Input 1 with a possibility of 11%. The access to $C_{110}$ is missed due to soft errors on Input 0, with a possibility is 22%. Hence, after application of IPF as seen in FIG. 14B, if the state of SDC bit $C_{111}$ is assigned the same as that of $C_{011}$ (with error possibility of 53%), the soft error rate can be minimized, with the possibility of an output error in response to a soft error on Input 2 dropping to 0%.

Figure 13:
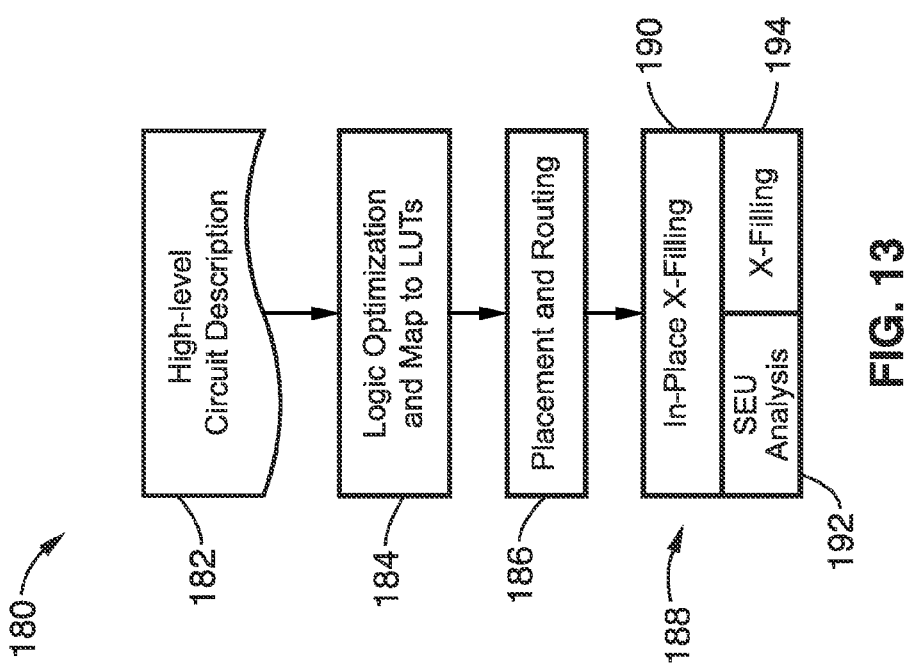
FIG. 13 is a flow diagram of executing in-place X-filling (IPF) according to an embodiment of the present invention.

FIG. 13 illustrates one example embodiment 180 of overall execution flow for IPF. IPF is performed after physical synthesis, which preferably includes high-level circuit description 182, logic optimization and mapping to LUTs 184, and placement and routing 186. IPF 188 is then applied to this mapped, placed, and routed circuit by initiating in-place X-filling 190 followed by SEU fault analysis 192 to get the criticality for each CRAM bit (i.e., priority among critical CRAM bits), followed by assigning SDC bits 194 according to the criticalities of CRAM bits to minimize the SEU fault impact on FPGA.

Table 2 depicts a comparison of fault rates for a number of different circuits, shown having different numbers of LUTs. The table compares LUT failure rates, chip failure rates, and execution runtimes for the various processes. The comparisons are made between output from the Berkeley ABC mapper, in-place decomposition (IPD) described in a later section, and the in-place X filling (IPF) technique described above. It should be noted that although more MTTF failure improvement on LUTs only are obtained from IPD, while three times more MTTF improvement for the chip level IPF with IPF while execution is more than 120× faster compared to IPD.

IPV (In-Place Inversion):

Modern FPGAs use routing architecture based on MUXs. When an

SEU occurs on a routing CRAM bit, it changes the driver of one interconnect, and the soft error rate depends on the signal discrepancy between the original driver and the erroneous driver, i.e., there is no error if the original driver and the erroneous driver carry the same logic value.

In-place inversion (IPV) is a re-synthesis technique that inverts the polarity of logic by selectively reassigning the driving LUT logic polarities in order to reduce the soft error rate (SER).

Figure 14:
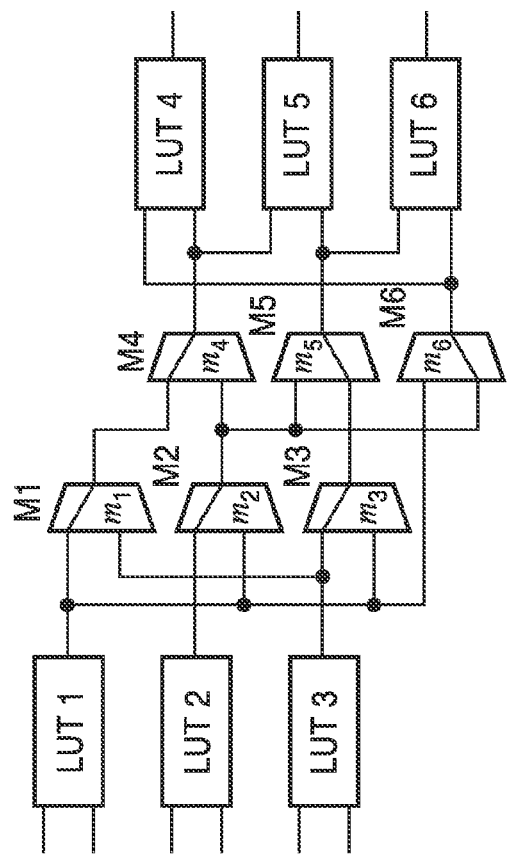
FIG. 14 is a schematic of unidirectional routing architecture as utilized by in-place inversion (IPV) according to an embodiment of the present invention.

FIG. 14 illustrates modern FPGA unidirectional routing architecture, having LUT 1 through LUT 3, interconnected to LUT 4 through LUT 6 by circuits shown by way of example comprising MUXs M1 through M6. Multiplexor state is shown controlled in response to CRAM bits $m_1$ through $m_6$ shown for routing control selection on respective MUXs.

Figure 15B:
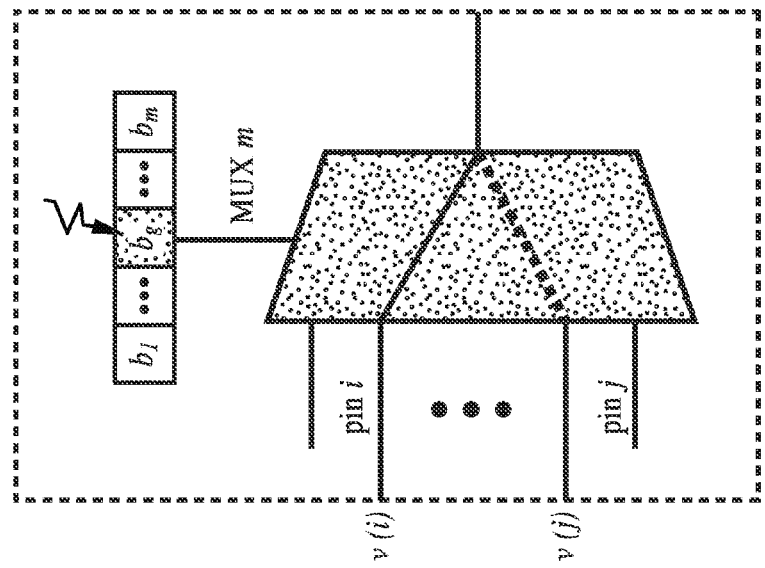
FIG. 15A through FIG. 15B is a schematic depicting the effect of SEU on routing a CRAM bit for in-place inversion (IPV) according to an embodiment of the present invention, and showing a detail of one of the multiplexors.
Figure 15A:
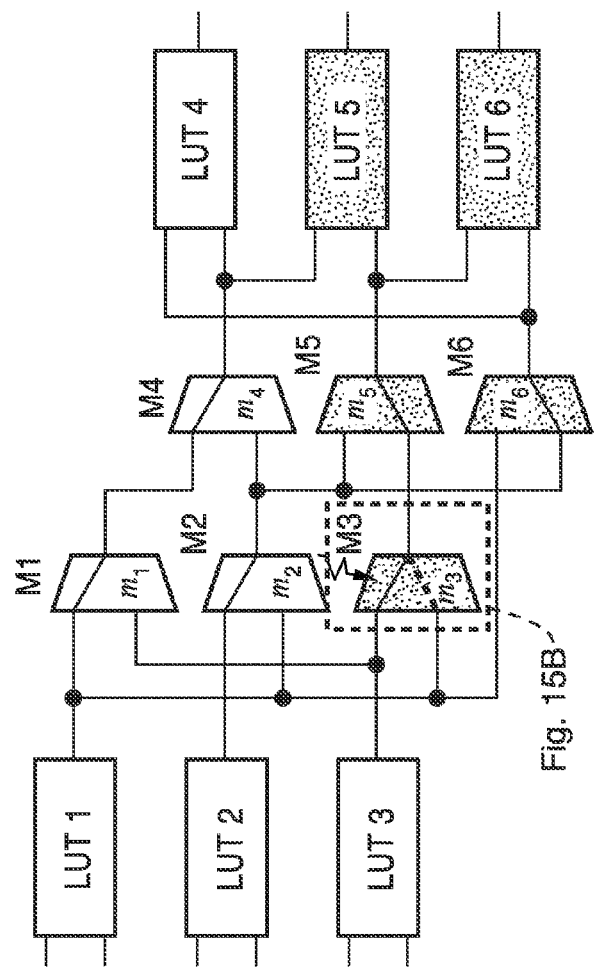

FIG. 15A through FIG. 15B illustrates by way of example, the impact of SEU on a routing CRAM bit, with an overall schematic in FIG. 15A and a magnified view of a specific multiplexor in FIG. 15B. The CRAM bits $\{b_1, \ldots, b_m\}$ configure MUX m to select pin i as an output as seen in FIG. 15B. Supposing an SEU occurs on CRAM bit $b_i$, the selection of MUX m is reassigned to pin j, which may cause functional failures. More specifically, when pin i and pin j have different signal values the wire driven by MUX m carries a faulty value.

Therefore, fault masking at MUX m is performed according to the invention. By reducing the signal discrepancy of coupled signals at all MUXs (as pin i and pin j in FIG. 2) in the circuit, the probability is reduced of MUXs carrying faulty values while circuit SER is also minimized.

To reduce the signal discrepancy, this embodiment of the invention selectively inverts the truth table of LUTs in a circuit. In general, the input pins of a routing MUX are driven by LUTs. Therefore, the signal discrepancy primarily depends on the truth tables of LUTs.

Figure 16:
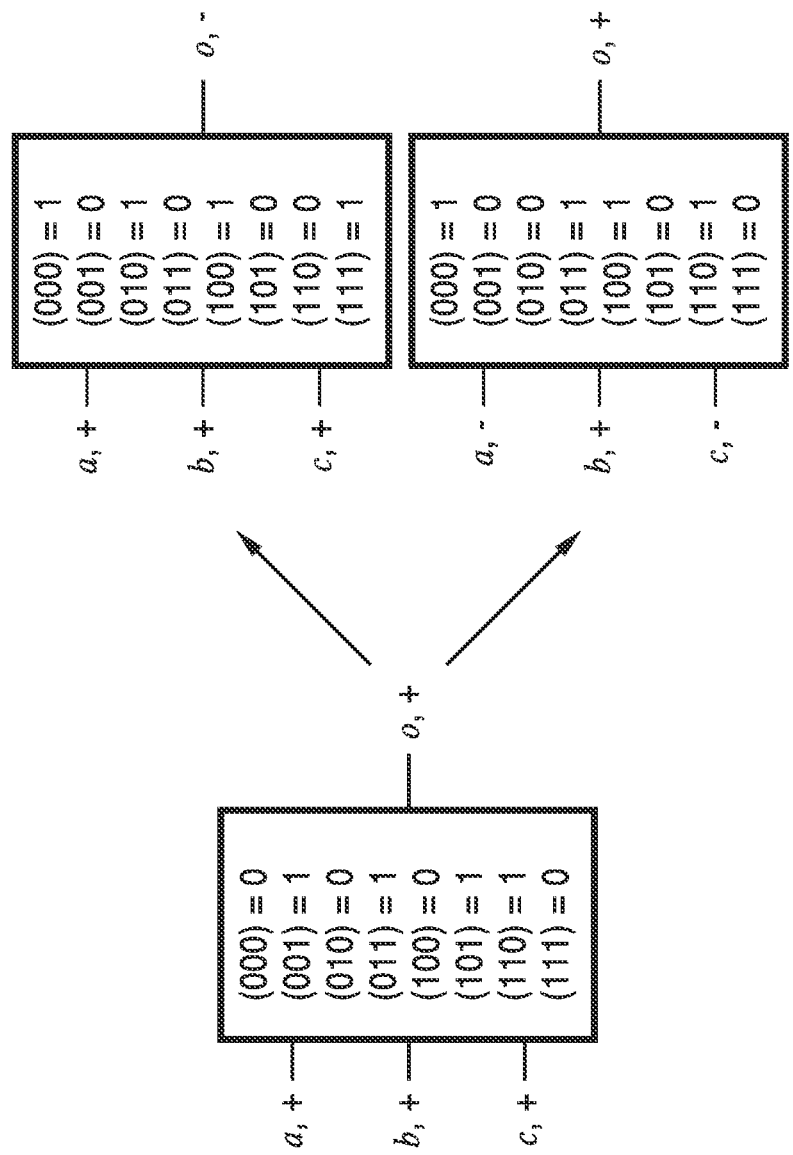
FIG. 16 is a truth table for a look-up table (LUT) showing logic polarity inversion according to an embodiment of the present invention.

FIG. 16 illustrates the concept of logic polarity inversion by altering the truth table of involved LUTs, without impacting the functionality of the LUT network. To invert the logic polarity of a LUT, all the truth table values in the LUT are simply inverted, from 0→1 or 1→0. Specifically, the original truth table is referred to as positive logic, while the inverted truth table is referred as negative logic, respectively as shown in the figure. After logic polarity inversion of a LUT, all of the truth table of its fanout LUTs, the driven LUTs, are adjusted in order to preserve the circuit functionality, which does not affect signal discrepancy and has no effect on soft error rate.

Figure 17B:
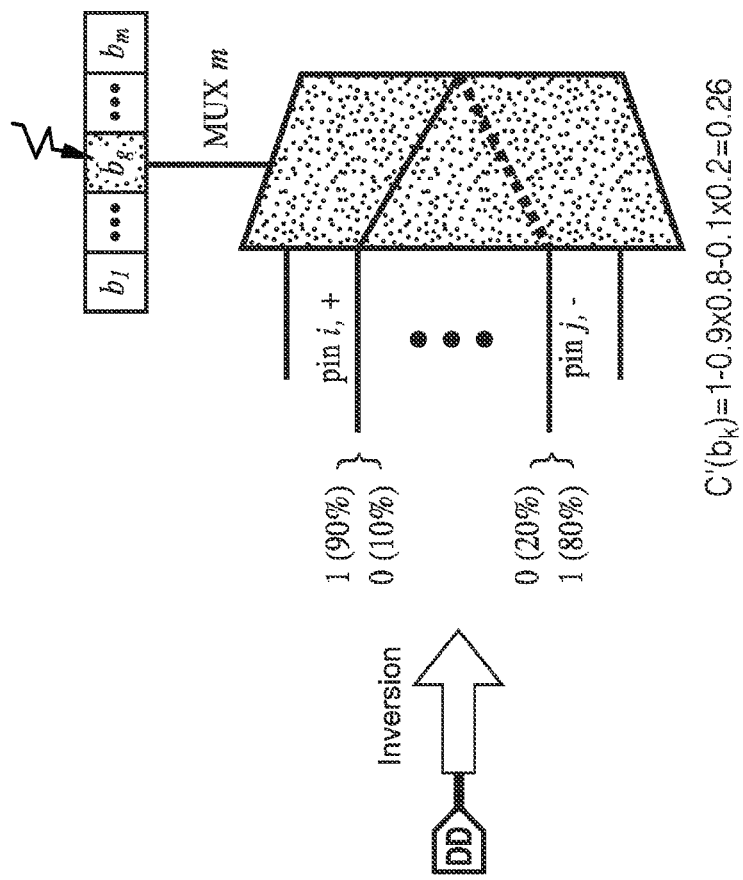
FIG. 17A through FIG. 17B are schematics of LUT polarity inversion within in-place inversion (IPV) according to an embodiment of the present invention for improving fault tolerance.
Figure 17A:
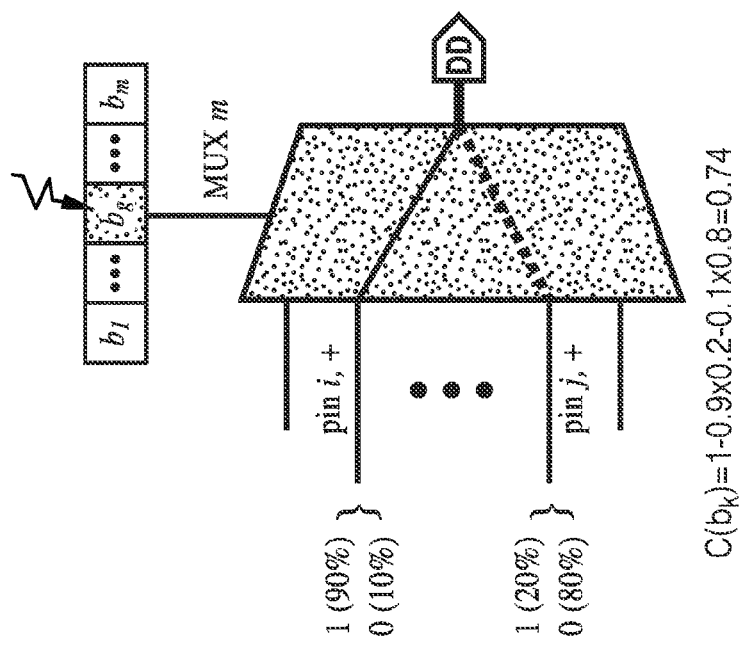

FIG. 17A through FIG. 17B illustrate that wise inversion of the LUT from that shown in FIG. 17A to that shown in FIG. 17B, can reduce the signal discrepancy and improve fault tolerance (e.g., reduced SER). Since all the changes are performed by means of logic polarity inversion, only the truth tables of LUTs are affected, and the circuit placement and routing structure can be preserved. Therefore, utilization of IPV as an in-place inversion technique and the cost on design closure is minimal. In the figure, given a routing MUX m, and the selection of the signal to be routed through is pin i under normal conditions without any fault presenting, where the signal probability of pin i (the probability of the signal carrying logic 0 or 1) is 90% for logic 1 and 10% for logic 0. The bits $\{b_1 \ldots b_m\}$ are the CRAM bits controlling the MUX selection of pin 1 to pin $2^m$.

Suppose that bit $b_g$ is flipped due to an SEU, and causes the signal selection to be changed from pin i to pin j. Therefore, when pin j carries different logic value of pin i, the output of MUX m is different from pin i, which results in an error. The criticality of $b_g$, denoted by $C(b_g)$, is the probability that pin i and pin j carry different logic values. Since pin j carries 80% of logic 0 and 20% of logic 1, the outputs of MUX m is very likely to be errored due the high signal discrepancy between pin i and pin j. However, if the logic polarity of pin j is inverted, the signal probability of pin j becomes 80% of logic 1 and 20% of logic 0, which is more similar to pin i, and therefore the error rate can be reduced. It will be noted that prior to applying IPV $C(b_g)=1-0.9\times0.2-0.1\times0.8=0.74$, while after IPV the output error in response to an SEU at $b_g$ dropped to $C(b_g)=1-0.9\times0.8-0.1\times0.2=0.26$ which is approximately ⅓ of the original failure rate.

Two important properties of IPV are: (1) a single CRAM bit fault for one routing MUX involves exact two nets (i.e., two routing trees), and (2) under a single fault model, fault masking for a single CRAM bit fault is solely decided by its pseudo fan-in pair (i.e., the driving LUTs for the above two routing trees).

Figure 18:
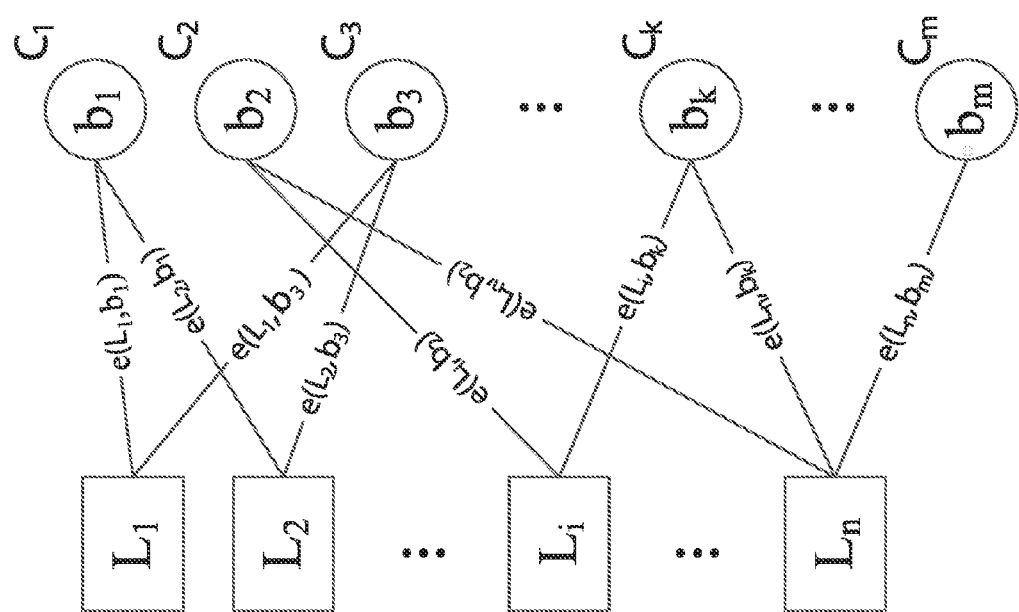
FIG. 18 is a bipartite graph representation of the in-place inversion (IPV) problem according to an embodiment of the present invention.

FIG. 18 illustrates a representation of an IPV problem based on the above two properties. A LUT $L_i$ is one of the LUTs within LUT $L_1$ to LUT $L_n$, while similarly CRAM bit $b_k$ represents one of the CRAM bits within bit $b_1$ through bit $b_m$. Given a placed and routed circuit, each node on the left $L_i$ represents one of the n LUTs in the circuit, and each node at the right $b_k$ represents one of the CRAM bits used in multiplexers. An edge $e(L_i,b_k)$ exists between $b_k$ and its pseudo fan-in pair LUTs. It will be noted that each node at the right has exactly two incoming edges. On the other hand, the number of outgoing edges of each node on the left depends on the number of multiplexers it is connected to. Each node at the right is annotated with a weight value $C_{(i=1,\ldots,m)}(i=1,\ldots,k)$, and the value is associated with the polarities of its pseudo fan-in LUTs specified by its two incoming edges. Thus, IPV reassigns all LUT polarities such that the total weight of all CRAM bits on routing multiplexers is minimized.

Figure 19:
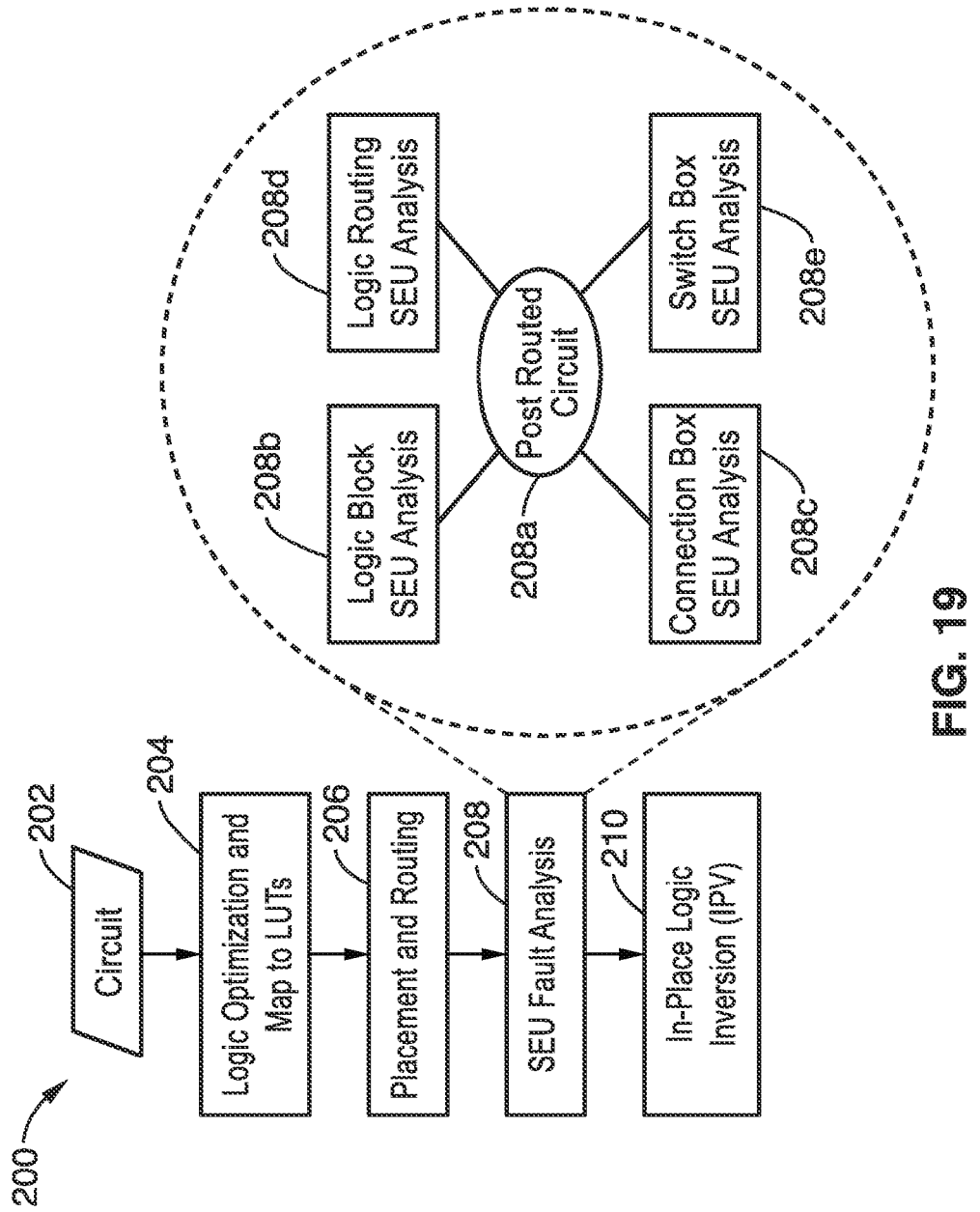
FIG. 19 is a flow diagram of overall in-place inversion (IPV) operation flow according to an embodiment of the present invention.

FIG. 19 depicts an example embodiment 200 of overall flow of the re-synthesis IPV method. After physical synthesis, including determining circuit design 202, logic optimization and mapping to LUTs 204, followed by placement and routing 206, then IPV can be applied. First, an SEU fault analysis 208 is performed to get the weight values for each routing CRAM bit. Then an in-place logic inversion (ILP) solver 210 is executed to seek for an optimal selection of the inverted LUTs to minimize the SEU fault impact on FPGA interconnects. SUE fault analysis 208 is shown broken down for the post routed circuit 208a to include logic block analysis 208b, connection box SEU analysis 208c, local routing analysis 208d, and switch box SEU analysis 208e.

Table 3 depicts size statistics of placed and routed benchmark circuits depicting both use with 4-LUTs having a cluster size of 4 (upper table section), and with 6-LUTs having a cluster size of 8 (lower table section). For the given number of LUTs (#LUT) array dimensions are shown (x,y) and routing channel width (w). The table illustrates the increased error rate (SER) reductions when in-place inversion (IPV) according to the invention is utilized with an ILP solver (e.g., Mosek ILP solver), or the simulated annealing (SA) solver. From the table, one can see that IPV coupled with either ILP or SA approaches can significantly reduce SER. For example, for 4-input LUT with a cluster size of 4, the interconnect SER is reduced by 1.2× to 17.2× with an average of around 6×. For a 6-input LUT with a cluster size of 8, the SER is reduced by about 5.4× on average.

In addition Table 3 reports runtimes. The listed runtimes do not include the fault simulation time for SER quadruplets, which is relatively small comparing to the time consumed by ILP. From the table, one can see that IPV coupled to ILP was able to solve 8 out of the 10 circuits exactly, except "alu4" and "des" where a time-out of 10 hours was applied to the ILP solver. For the above 8 circuits, IPV coupled to SA obtained the same SER reductions as ILP does but runs almost 100× faster. In addition, SA obtains slightly higher SER reductions for "alu4" and "des". Therefore, in this application it is seen that IPV coupled with SA based algorithm is highly effective and efficient.

Figure 20B:
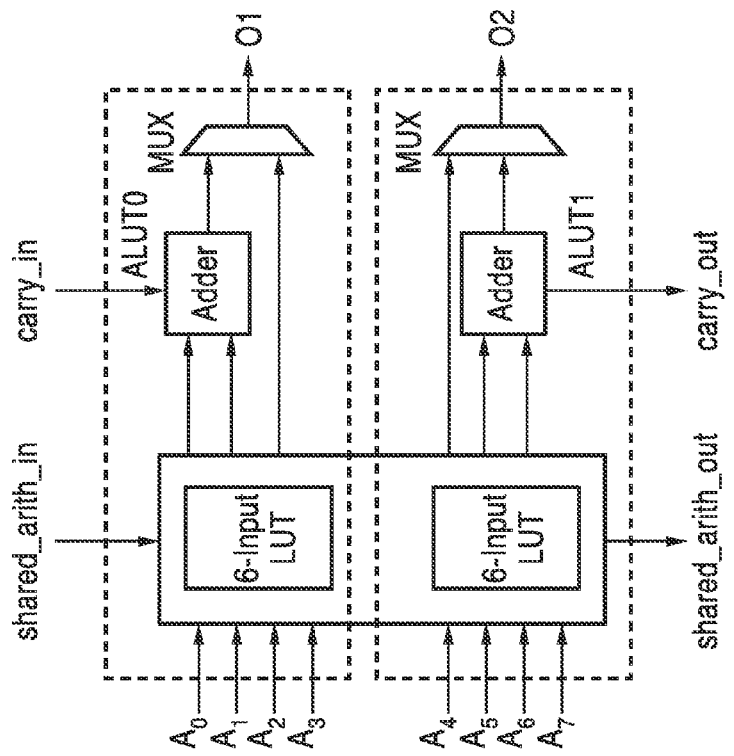
FIG. 20A through FIG. 20B are schematics of decomposable LUTs as utilized by two manufacturers, as is utilized during in-place decomposition (IPD) according to an embodiment of the present invention.
Figure 20A:
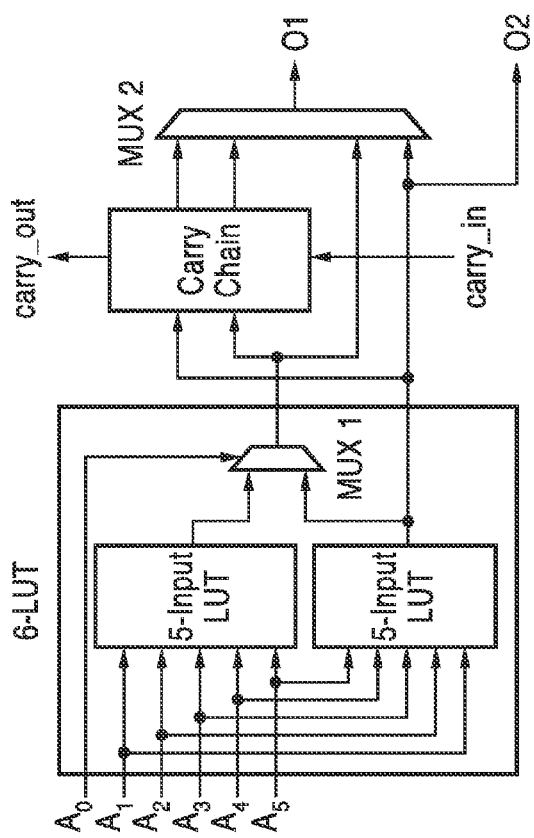

IPD (In-Place Decomposition):

FIG. 20A through FIG. 20B depict decomposable LUTs of Xilinx and Altera. Certain state-of-the-art FPGAs, such as Xilinx Vertix-5 (FIG. 20A) and Altera Stratix-IV (FIG. 20B), utilize decomposable LUTs, in which a LUT can be decomposed into two or more smaller LUTs with a second output pin provided.

In addition to the decomposable LUT, each programmable-logic block (PLB) in a modern FPGA also has a dedicated carry chain or adder. While the carry function can be implemented by LUTs, these carry chain circuits are built in as alternative circuits for use in high speed applications, such as networking, which require performing extensive carry computations.

In FIG. 20A a 6 input LUT (6-LUT) is shown in which the LUT is divided into two 5-input LUTs (5-input LUT), whose outputs are directed through a first multiplexor (MUX1) controlled by one of the 6 input bits of the 6 input LUT. Output from the 6-LUT is received by a carry chain (Carry Chain) having a carry in (carry_in) and a carry out (carry_out), with pre and post carry chain signals routed through a second multiplexor (MUX2). A first output (O1) and second output (O2) are generated.

In FIG. 20B two interconnected LUTs are shown (ALUT0 and ALUT1), each indicating inclusion of a 6 input LUT, receiving a shared arithmetic signal (shared_arith_in) and outputting a shared arithmetic signal (shared_arith_out) with two output from each LUT directed to an adder (Adder) and one output directly to a multiplexor (MUX). The adders receive a carry in signal (carry_in), while outputting a carry out signal (carry_out). In each LUT an output from the adder and from the 6-LUT are directed to a multiplexor (MUX), to generate first output (O1), and second output (O2).

Leveraging decomposable LUTs and under-utilization of large-sized LUTs, in-place decomposition (IPD) is a re-synthesis technique that decomposes a function into multiple subfunctions and combines the subfunctions to achieve the design optimization objectives.

Figure 21:
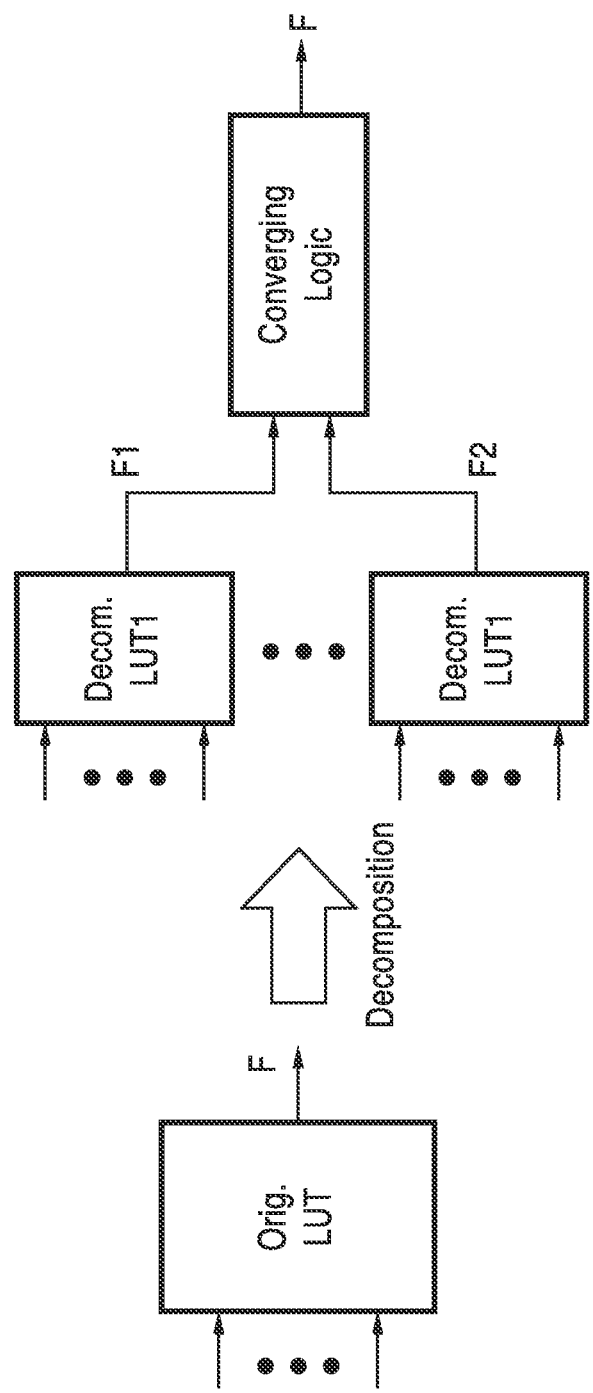
FIG. 21 is a schematic illustrating an in-place decomposition (IPD) process according to an embodiment of the present invention.

FIG. 21 illustrates an example of the basic concept of decomposition, wherein after physical syntheses, a function of the circuit depicted as the original LUT at left with function F is decomposed into multiple subfunctions by implemented by smaller LUTs of a decomposable LUT, shown as decomposed LUT1 performing function F1 and decomposed LUT2 performing function F2. These subfunctions are combined by the converging logic at the right within which functions F1 and F2 are converged back into function F, thereby preserving circuit function after decomposition. In addition, the number and size of subfunctions can be arbitrarily selected depending on the architecture of the decomposable LUT and the function to be decomposed. Furthermore, the converging logic can be any function depending on the optimization objectives.

Figure 22B:
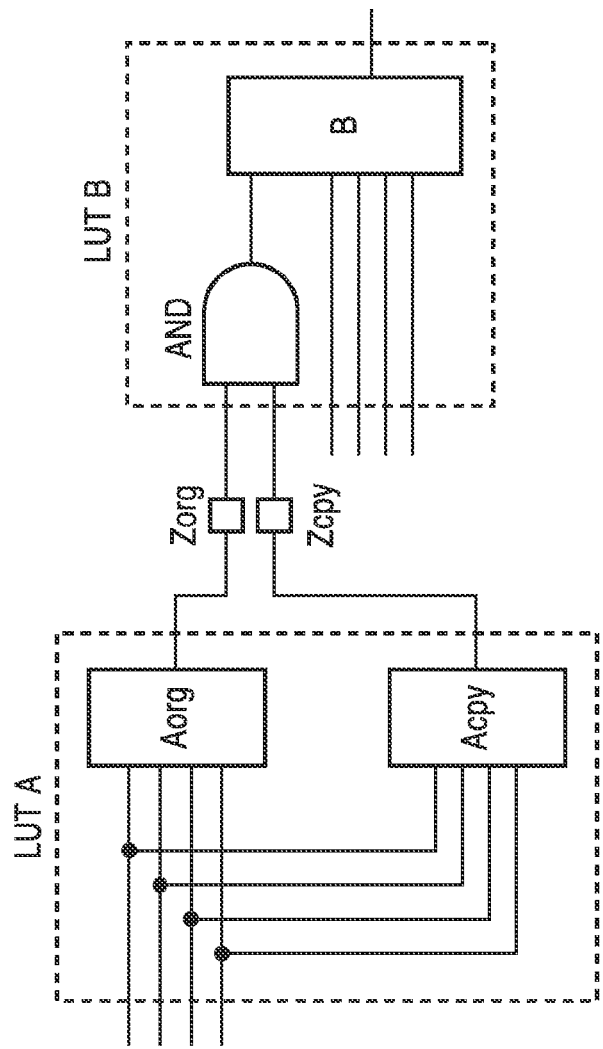
FIG. 22A through FIG. 22B are schematics of encoding the converging logic to the fanout LUTs of the decomposed function in response to in-place decomposition (IPD) according to an embodiment of the present invention.
Figure 22A:
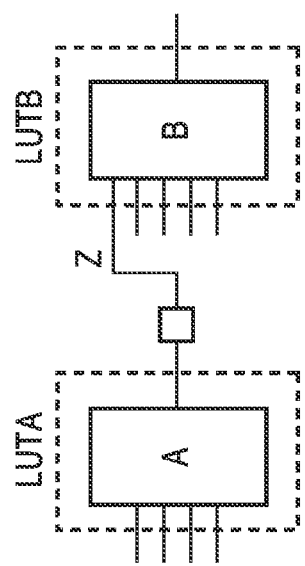

FIG. 22A through FIG. 22B depict the concept of encoding the converging logic to the fanout LUTs of the decomposed function, according to one potential implementation. An original logic block of LUTA to LUTB connection, including connection Z directed to an unused fanout input of LUT B, is shown as an in FIG. 22A. FIG. 22A is then shown implemented as a duplicated logic block in FIG. 22B having original block (Aorg) and copy block (Acpy). A decomposition is shown of LUT A into sub-LUTs Aorg and Acpy, with signals Zorg and Zcpy received by LUTB at an AND gate with LUT subsection B. The second output of the dual-output LUT is used to duplicate the original function and the combining of the original function and the copied function is performed by encoding an AND (AND) operation to the fanout LUT (LUT B). To combine the additional signal, the encoding occupies one unused input pin of the fanout LUT. It will be appreciated that in the example duplication is utilized as a form of decomposition for the sake of simplicity. The two subfunctions can be arbitrary as long as the total functionality is preserved. In addition, the number of the encoded fanout LUTs and the type of the encodings can also be flexible according to the optimization objectives.

By way of example and not limitation, a second way to implement converging logic is utilizing built-in hard macros, such as the built-in carry chain as shown in FIG. 20 or a built-in adder as shown in FIG. 20B. For example, a typical carry out function has three inputs, a, b, and carry-in, and when the carry-in of a carry chain or adder is fixed to 0 or 1, the carry-out function becomes the AND or OR function of inputs a and b. It should be appreciated that fixing a or b has the same effect to the other two inputs, respectively, and therefore the two signals to be converged can be connected to any two inputs of the carry chain or adder. Since the technique performs logic decomposition and converging within the original PLB, it does not change PLB level placement and routing, and therefore there is no PLB level penalty on timing, area and design closure.

Figure 23:
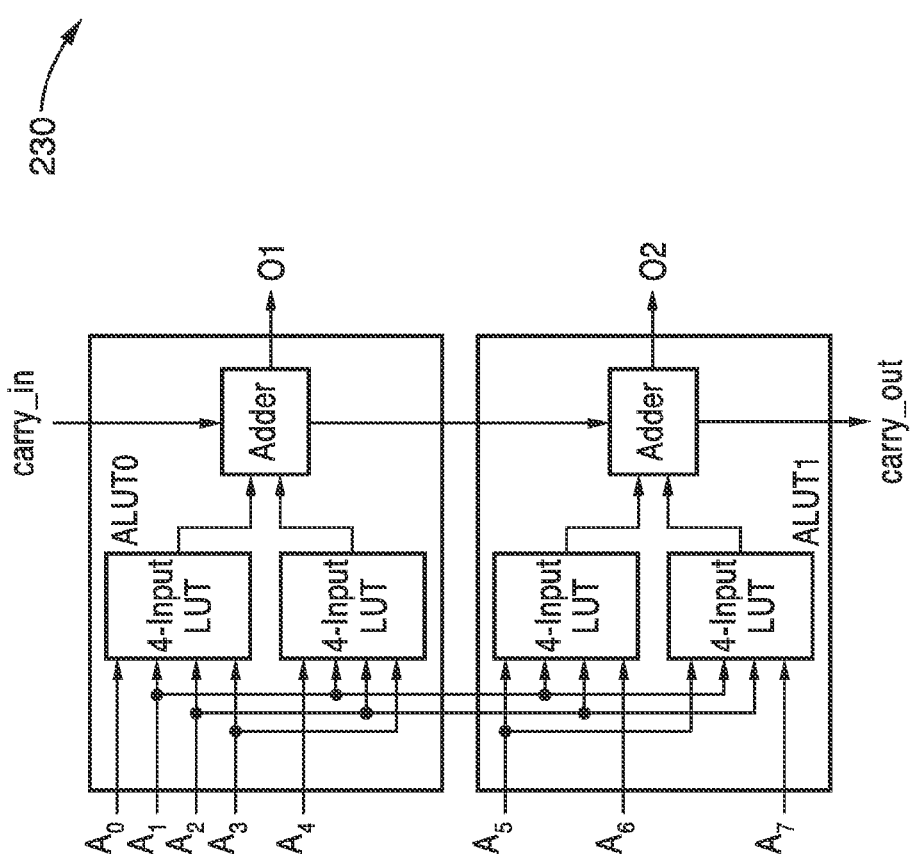
FIG. 23 is a schematic of a programmable-logic block (PLB) supporting multiple outputs, multiple hard macros, and in-place decomposition for use by in-place decomposition (IPD) according to an embodiment of the present invention.

FIG. 23 illustrates an example of a PLB architecture supporting multiple outputs and multiple hard macros, in-place decomposition with multiple subfunctions and multiple converging logic toward achieving improved optimization results. Two LUTs are depicted in the figure, ALUT0 and ALUT1. ALUT0 receives 5 inputs $A_0$ through $A_4$ and is decomposed into two 4 input LUTs and an adder (Adder) with output $O_1$. ALUT1 is similarly decomposed receiving two inputs from ALUT0 and 3 external inputs $A_5$ through $A_7$ whose outputs are directed to another adder (Adder) having an output $O_1$. A carry signal (carry_in) is received by ALUT0 while ALUT1 outputs a carry out (carry_out).

Two important properties of the inventive IPD method are: (1) among different types of two input converging logic, an optimal decomposition for robustness can be achieved by AND or OR converging logic; and (2) an optimal decomposition for robustness can be achieved by duplicating the original function with AND or OR converging logic if the duplication can be applied by sufficient resources.

Figure 24:
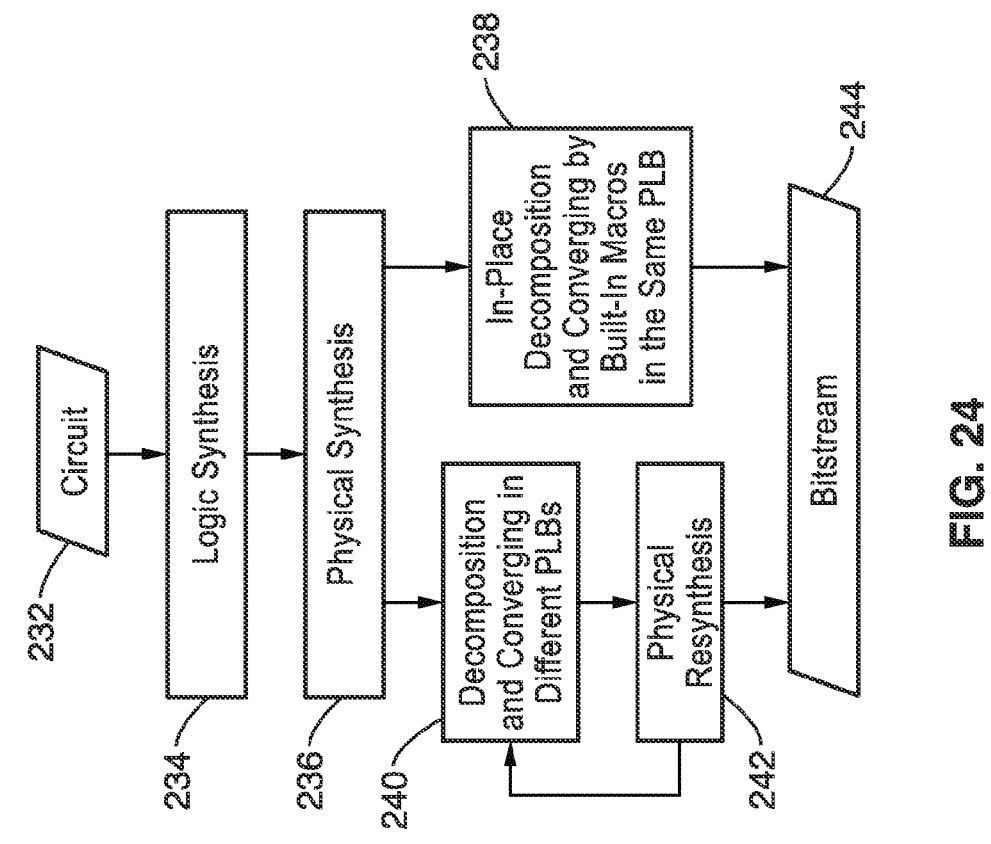
FIG. 24 is a flow diagram of a re-synthesis algorithm utilized during in-place decomposition (IPD) according to an embodiment of the present invention.

The above properties can be utilized to relax the complexity of IPD algorithms toward finding an optimal decomposition for robustness FIG. 24 illustrates an example embodiment 230 of overall flow for the re-synthesis algorithm. A circuit is designed 232, its logic synthesized 234, and then a physical synthesis 236 performed, such as for a specific FPGA. After physical synthesis 236, decomposition techniques can be applied to a mapped, placed, and routed circuit. With converging in different PLBs, a circuit needs to be re-routed because of the additional wires connected from the decomposed LUTs to their fanout LUTs. When the converging is performed by the built-in hard macros, such as carry chains or adders, it is in-place decomposition 238. It does not change the placement and routing, and there is no area and timing overhead at the PLB level. Otherwise decomposition and converging is performed in different PLBs 243 iteratively with a physical resynthesis 242 until the results are optimized for bitstream 244.

Figure 25:
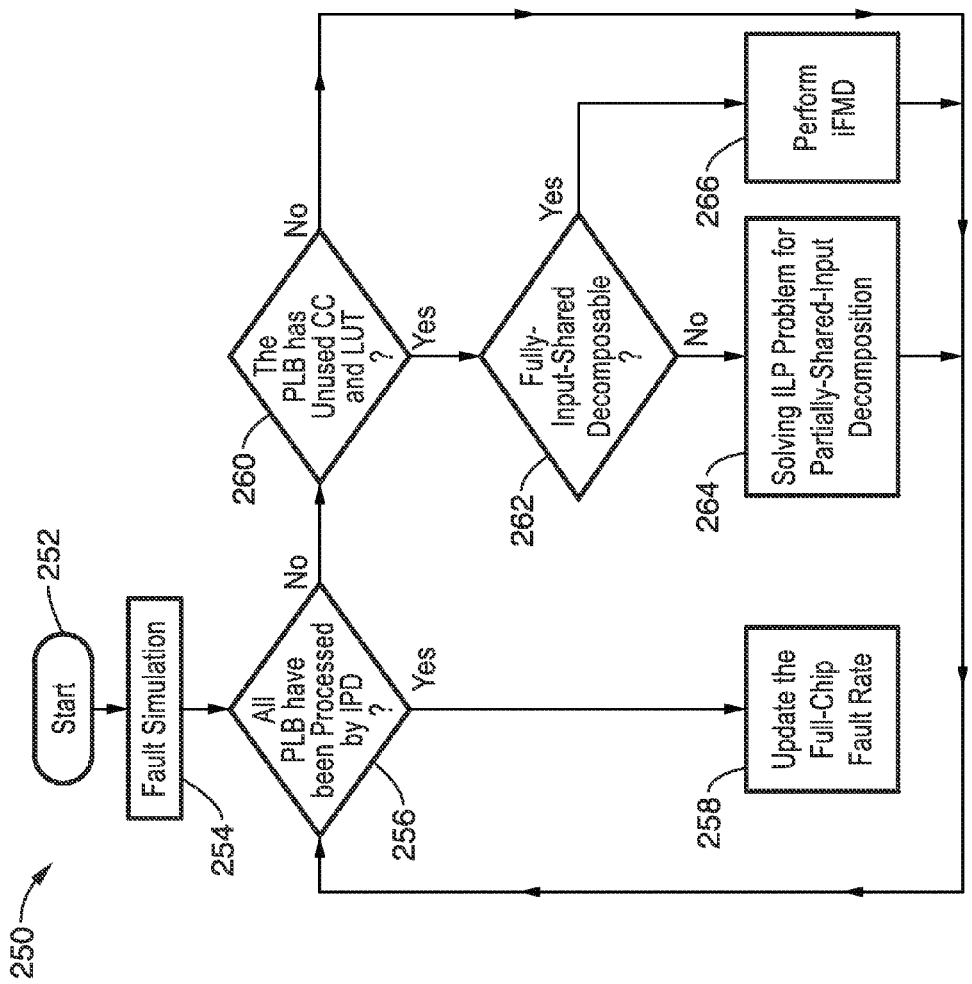
FIG. 25 is a flow diagram of in-place decomposition (IPD) to increase robustness in FPGA against SEUs according to an embodiment of the present invention.

FIG. 25 illustrates an example embodiment 250 of flow during in-place decomposition toward increased robustness against SEUs within an FPGA. Given a circuit C, the algorithm starts 252 with a circuit fault simulation 254 to calculate the criticality of each LUT SRAM bit. The algorithm first checks whether all PLBs have been processed 256, if so then the full-chip fault rate is updated 258. It is determined 260 if there are any un-used carry chains and LUTs, and if so if it is decomposable 262. To improve the efficiency of the algorithm, the two properties described above are applied while preserving optimality. Thus, for a PLB that has an un-used carry chain and a LUT, duplication 266 of the function (called iFMD in the figure) is applied to the PLB if it was found to be decomposable. If duplication of the function cannot be applied, the decomposition problem is formulated to an integer programming problem (ILP) and solved optimally 264, where the details of the ILP algorithm are described below.

Detailed ILP Method Description:

An objective of the IPD optimization process is that the criticality update of a LUT after decomposition is independent to that of other LUTs. The optimization problem is formulated by the Integer Linear Program (ILP) problem describes this objective:

$$\text{Minimize} \sum_{L \in LUTs(C)} \sum_{x_i \in V(L)} C_{x_i}^L (O1_{x_i}^L + O2_{x_i}^L)$$

subject to the following five sets of constraints.

Decomposition selection constraint for each CLB is given by, $$\sum_{j=1}^{\phi(L)} d_j^L \leq 1, \forall L \in LUTs(C)$$

in which $\phi(L)$ is the set of decomposition templates, such as those seen in Table 4 described below for Xilinx and Altera PLBs, and which are applicable to a decomposable LUT L, and $d_j^L \in 0$, in which j is 1 if the jth decomposition template is selected for LUT L, and this constraint guarantees that there is at most one decomposition template is selected and applied to each LUT.

Boolean matching constraints for each CLB are given by:

$$\sum_{x_i \in V(L)} t_{x_i}^{d_j^L} \geq V(L) \cdot d_j^L, \forall L \in LUTs(C), 1 \leq j \leq \phi(L)$$

where V(L) is the set of permissible input vectors for decomposable LUT L. Value $$t_{x_i}^{d_j^L}$$

is a binary variable, which is equal to logic 1 only when the Boolean function of L and that of decomposition $d_i^L$ are equivalent under input vector $x_i$. This set of constraint guarantees that a decomposition template $d_i^L$ should not be selected if there exists any inconsistency in the decomposed Boolean function.

Boolean matching constraints for each LUT SRAM bit of a CLB is given by the following, $$0 < T1_{d_j^L}(x_i) + T2_{d_j^L}(x_i) - 2 \cdot t_{x_i}^{d_j^L} \leq 1,$$

$\forall L \in LUTs(C), 1 \leq j \leq \phi(L), x_i \in V(L), L(x_i) = 1,$ $$2 \leq T1_{d_j^L}(x_i) + T2_{d_j^L}(x_i) + 2 \cdot t_{x_i}^{d_j^L} \leq 3,$$

$\forall L \in LUTs(C), 1 \leq j \leq \phi(L), x_i \in V(L), L(x_i) = 0.$

The above third set of constraints is utilized in the Boolean matching of decomposition $d_i^L$ with AND converging logic under any input vector, where $T1_{d_j^L}(x_i)$ and $T2_{d_j^L}(x_i)$ are truth table value of LUTs L1 and L2 under input vector $x_i$. Similarly, for OR or other types of converging logic, the above constraints can be applied with slight modification.

Observability update constraints are given by, $0 < d_i^L + T2_{d_i^L}(x_i) - 2 \cdot P1_{x_i}^L \leq 1$ $0 < -1 \cdot d_i^L + T2_{d_i^L}(x_i) + 2 \cdot B1_{x_i}^L \leq 1$ $-1 \cdot P1_{x_i}^L + O1_{x_i}^L \geq 0$ $B1_{x_i}^L + O1_{x_i}^L \leq 1,$ $\forall L \in LUTs(C), 1 \leq i \leq V(L)$ If decomposition $d_i^L$ with AND converging logic is applied, the above fourth set of constraints calculate the internal observability for any input vector based on truth table of L1 and L2. $P1_{x_i}^L$ and $B1_{x_i}^L$ are binary variables which represent the propagation and masking of signal from L1 ($P2_{x_i}^L$ and $B2_{x_i}^L$ for L2, respectively). Again, it is shown that only constraints for AND converging logic since other converging logic can be generated accordingly.

Default observability constraints are given by the following, $$O1_{x_i}^L + \sum_{j=1}^{\phi(L)} d_j^L \geq 1 O2_{x_i}^L + \sum_{j=1}^{\phi(L)} d_j^L \geq 1,$$

$\forall L \in LUTs(C), 1 \leq j \leq \phi(L), 1 \leq i \leq V(L)$

The last set of constraints state when no decomposition is applied to LUT L, the observability is one under any input vector.

Table 4 depicts experimental results and fault rate statistics of placed and routed benchmark circuits comparing a baseline algorithm (BASE), where circuit synthesis is exemplified by the Berkeley ABC tool without any fault tolerant optimization technique, a fully masked algorithm (FMD) where the IPD is limited to duplication only and their converging is by other LUTs in different CLBs, and variations of the in-place decomposition (IPD) according to the invention. The upper portion of the table indicates the number of pin inputs (PI #), pin outputs (PO #), and number of LUTs (LUT #) for implementing the given logic circuit. It should be noted that "dual-output 6LUT" as seen in the table are results for Xilinx Virtex-5 GLUT architecture, and "ALM" are results for Altera Stratix-IV ALM architecture. It will be noted that for all the 10 benchmark circuits, IPD improved fault rates compared to both the baseline algorithm and FMD. The fault rate improvement increases as more (from 0% to 30%) carry chains are used. A mean, ratio, and mean-time-to-failure (MTTF) ratio are shown at the bottom of the table based on all then circuits. It is noted that a higher MTTF is obtained for Altera ALM than for Xilinx dual-output 6LUT. While FMD improved MTTF by only by 10% on average, IPD (selected with a conservative 20% utilization rate for carry chains) improved average MTTF by 1.43× and 2.70× for Xilinx and Altera architectures, respectively. When all carry chains are available (utilization rate is 0%), IPD was found to improved MTTF by up to 2.43× (see circuit "ex1010" whose errors were reduced from 1.24% to 0.51%) for Xilinx architecture, and up to 9.67× (see "apex2" in which errors were reduced from 0.29% to 0.03%) for the Altera architecture. Because in-place duplication is used exclusively for Xilinx architecture, the gap between 10% and 1.43× is the improvement due to performing logic converging within the same programmable-logic block (PLB). Because the Altera architecture uses both in-place decomposition and in-place duplication, the gap between 1.43× and 2.70× is a good indicator of improvement due to decomposition according to the inventive IPD method. The table also shows runtimes in seconds for the IPD process on prototype algorithms. It is expected that the efficiency of the prototype algorithms can be significantly improved leading to significantly quicker run times.

Figure 26:
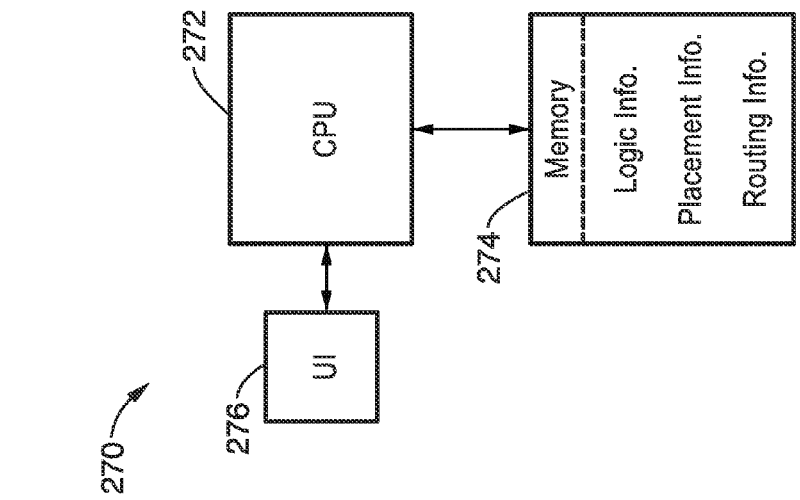
FIG. 26 is a block diagram of a computer configured for performing the various in-place logic optimizations (IPR, IPF, IPV, and IPD) according to an embodiment of the present invention.

FIG. 26 illustrates an FPGA synthesis system 270 upon which the present invention can be operated. A computer processor (CPU) 272 is coupled to a memory 274 configured for retaining programming as well as FPGA synthesis information, including information on logic, placement and routing. A user interface 276 couples to the computer for allowing a user to control the synthesis process.

It will be appreciated that elements of the present invention are implemented for execution within apparatus 270, such as in response to programming resident in memory 274 which is executable on CPU 272. In addition, it will be appreciated that elements of the present invention can be implemented as programming stored on a media, wherein said media can be accessed for execution by CPU 272.

It should be appreciated that the programming is executable from the memory which is a tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

It should be appreciated that the programming described herein is executable from a memory device (or devices) which comprise a tangible (physical) computer readable media that is non-transitory in that it does not merely constitute a transitory propagating signal, but is actually capable of retaining programming, such as within any desired form and number of static or dynamic memory devices. These memory devices need not be implemented to maintain data indefinitely, or under all conditions (e.g., power fail) to be considered herein as non-transitory media.

Accordingly, the present invention provides methods and apparatus for in-place resynthesis and remapping techniques for soft error mitigation in FPGAs. Inventive teachings can be applied in a variety of apparatus and applications, including other logic devices, ASICs, and so forth.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

It will be appreciated from the description herein that the present invention includes the following inventive embodiments among others:

An embodiment of the invention is a device for logic resynthesis within an FPGA, which is performed in-place without changing the placement and routing of LUTs, or the functions.

Another embodiment of the invention is a device for performing in-place resynthesis which is applicable to a wide range of logic device designing, including FPGAs, VPGAs, PLAs, ASICs, and so forth.

Another embodiment of the invention is a device for increasing fault tolerance of a logic array being designed (FPGA, PLA, ASIC, and so forth).

Another embodiment of the invention is a device for increasing fault tolerance to single event upsets (SEUs) within the resultant logic array device.

Another embodiment of the invention is a device for increasing fault tolerance in response to an in-place reconfiguration (IPR) operation performed following physical synthesis.

Another embodiment of the invention is a device for increasing fault tolerance in response to an in-place X-filling (IPF) operation performed following physical synthesis.

Another embodiment of the invention is a device for increasing fault tolerance in response to an in-place inversion (IPV) operation performed following physical synthesis.

Another embodiment of the invention is a device for increasing fault tolerance in response to an in-place decomposition (IPD) operation performed following physical synthesis on dual-output LUTs.

A still further embodiment of the invention is a device for maximizing fault tolerance without requiring additional physical synthesis.

It will further be appreciated from the description herein that the present invention includes the following inventive embodiments among others:

1. An apparatus for increasing fault tolerance of an FPGA circuit, comprising: a computer configured for designing an FPGA circuit; and programming executable on said computer for: describing a logic circuit for implementation on the FPGA circuit and routing of circuits through a synthesis process which arrives at a physical design; performing a circuit analysis on said logic circuit; performing in-place iterations of reconfiguring, don't care X filling, and/or inversion of look-up table (LUT) bits toward increasing overall reliability of said logic circuit; and updating said FPGA circuit in response to said in-place iterations; wherein said in-place iterations are performed after placement and routing to preserve physical design while optimizing the logic circuit to mask faults originating upstream.

2. The apparatus of embodiment 1, wherein said programming executable on said computer is configured to perform said in-place iterations as multiple iterations of an in-place resynthesis (IPR) process in which a group of look-up-tables (LUTs) are selected as a sub-network and identical configuration bits corresponding to complementary inputs of said group of LUTs are maximized, whereby faults seen at a pair of complementary inputs have a lower probability of propagation toward increasing overall reliability of the circuit.

3. The apparatus of embodiment 1: wherein said programming executable on said computer is configured to perform said in-place iterations as iterations of an in-place X-filling (IPF) process to a convergence in which states are determined for satisfiability don't cares (SDCs); and wherein said programming executable on said computer is configured to perform said in-place X-filling (IPF) process in response to performing single event upset (SEU) fault analysis, followed by assigning satisfiability don't care (SDC) bits in response to criticality of LUT configuration bits by assigning said SDC bits to a logic value which maximizes correct logic output probability from a LUT toward minimizing fault impact from SEUs.

4. The apparatus of embodiment 1, wherein said programming executable on said computer is configured to perform said in-place iterations by performing single event upset (SEU) fault analysis to obtain weight values for routing configuration memory (CRAM) bits, followed by performing in-place logic inversion which inverts functions of driving logic in response to reassigning look-up table (LUT) polarities, followed by adjusting all of the truth tables of its fanout LUTs and driven LUTs to preserve functionality, whereby total weight of configuration memory (CRAM) bits on routing multiplexers is minimized.

5. An apparatus for increasing fault tolerance of a synthesized FPGA circuit, comprising: a computer configured for designing an FPGA circuit; and programming executable on said computer for: describing a logic circuit for implementation on the FPGA circuit; performing a circuit analysis on said logic circuit; performing multiple iterations of an in-place resynthesis (IPR) process in which a group of look-up-tables (LUTs) are selected as a sub-network and identical configuration bits corresponding to complementary inputs of said group of LUTs are maximized, whereby faults seen at a pair of complementary inputs have lower probability of propagation through said logic circuit toward increasing overall reliability of the circuit; and updating said FPGA circuit in response to said in-place reconfiguration; wherein said in-place resynthesis is performed after placement and routing toward preserving physical design and to optimize the logic circuit by maximizing the number of identical LUT configuration bits to logically mask faults originating upstream.

6. The apparatus of embodiment 5, wherein said programming executable on said computer is configured to make pairs of LUT configuration bits identical in response to conjoining with $\Psi$ (CF), wherein CF is a cone, and $\Psi$ is a Boolean formula.

7. The apparatus of embodiment 5, wherein said programming executable on said computer is configured to perform said multiple iterations comprising in-place Boolean matching to check if, $$\Psi(CF) \wedge \bigwedge_{(c_i, c_j) \in S_P} c_i \leftrightarrow c_j,$$

can be satisfied for sets of pairs of configuration bits SP, which is initialized as all pairs of configuration bits of LUTs in S, a subset of fanouts of $\eta_{opt}$, wherein CF is a cone, $\Psi$ is a Boolean formula, (ci, cj) are a pair of LUT configuration bits, and $\eta_{opt}$ is a critical LUT interconnect.

8. The apparatus of embodiment 5, wherein said programming executable on said computer is configured to select said look-up-tables (LUTs) in response to their criticality regarding impact on the overall logic circuit.

9. The apparatus of embodiment 8, wherein said programming executable on said computer is configured to order said selected LUTs in descending order of criticality, and each of said multiple iterations selects a next LUT in the order and reconfigures toward reducing criticality; wherein a cone comprising a logic block with multiple LUTs containing the next LUT is formed and the LUTs inside the cone are reconfigured using an in-place Boolean matching that preserves both the logic function and the topology of the cone.

10. The apparatus of embodiment 5, wherein said programming executable on said computer is configured for determining maximization of configuration bits in response to a Boolean matching process ordered on the basis of which configuration bits can mask more faults after being set as identical.

11. The apparatus of embodiment 10, wherein said programming executable on said computer is configured to perform said Boolean matching in response to Boolean Satisfiability.

12. The apparatus of embodiment 5, wherein said programming executable on said computer is configured to perform said circuit analysis in response to a full-chip functional simulation and an observability don't-care (ODC) masking calculation.

13. The apparatus of embodiment 5, wherein said programming executable on said computer is configured to consider a cone as said group of LUTs, and to reserve logic functions of cone outputs to allow rerouting between LUTs within said group of LUTs within the cone while not allowing placement and routing changes for LUTs outside of the cone.

14. The apparatus of embodiment 5, wherein said programming executable on said computer is configured for performing said updating in response to incremental updates to truth tables of said LUTs and updating of observability don't-cares (ODCs).

15. The apparatus of embodiment 5, wherein said programming executable on said computer is configured to perform said circuit analysis in response to utilizing an FPGA-base emulator for criticality computation and/or full-chip evaluation, in which bit criticality is determined in response to comparing the output of a circuit-under-test (CUT) into which faults are injected, with the output of a reference circuit, in response to each receiving the same input pattern.

16. The apparatus of embodiment 5, wherein said in-place reconfiguration (IPR) process is performed to maximize the signal probability of a preferred logic polarity.

17. The apparatus of embodiment 5, wherein said programming executable on said computer is configured to perform said updating after a desired number of iterations to cover a desired range of circuit parts.

18. An apparatus for increasing fault tolerance of a synthesized FPGA circuit, comprising: a computer configured for designing an FPGA circuit; and programming executable on said computer for: describing a logic circuit for implementation on the FPGA circuit and mapping to a plurality of look-up tables (LUTs); performing iterations of an in-place X-filling (IPF) process to a convergence in which states are determined for satisfiability don't cares (SDCs); performing single event upset (SEU) fault analysis; assigning satisfiability don't care (SDC) bits in response to criticality of LUT configuration bits by assigning said SDC bits to a logic value which maximizes correct logic output probability from a LUT toward minimizing fault impact from SEUs; and wherein said LUTs have a higher probability of maintaining a proper output value when the SDC bit is accessed in response to a soft error.

19. The apparatus of embodiment 18, wherein said assigning of satisfiability don't cares does not change the functionality of the original LUT netlist.

20. The apparatus of embodiment 18, wherein said programming executable on said computer is configured to converge quickly within approximately three iterations.

21. The apparatus of embodiment 18, wherein said apparatus improves reliability of LUTs in said FPGA circuit and mitigates single event upsets (SEUs) on interconnects.

22. The apparatus of embodiment 18, wherein said programming executable on said computer improves fault tolerance by exploiting existing "don't-cares" (DCs) which determine states of DC bits to mask soft errors in fan-in cones toward mitigating soft errors in SRAM-based FPGAs.

23. An apparatus for increasing fault tolerance of a synthesized FPGA circuit, comprising: a computer configured for designing an FPGA circuit; and programming executable on said computer for: describing a logic circuit for implementation on the FPGA circuit and mapping to a plurality of look-up tables (LUTs); performing placement and routing; performing single event upset (SEU) fault analysis to obtain weight values for each routing configuration memory (CRAM) bits; and performing in-place logic inversion which inverts functions of driving logic in response to reassigning look-up table (LUT) polarities, followed by adjusting all of the truth tables of its fanout LUTs and driven LUTs to preserve functionality, whereby total weight of all configuration memory (CRAM) bits on routing multiplexers is minimized.

24. The apparatus of embodiment 23, wherein said programming executable on said computer is configured to perform driven logic adjustments to modify the logic functions of fan-out LUTs to preserve functionality affected by polarity inversion.

25. The apparatus of embodiment 23, wherein said programming executable on said computer is configured to perform said single event upset (SEU) analysis in response to a logic block SEU analysis, connection box SEU analysis, logic routing SEU analysis, and a switch box SEU analysis.

26. The apparatus of embodiment 23, wherein said FPGA utilizes unidirectional routing architecture having programmable interconnect points (PIPs).

27. The apparatus of embodiment 26: wherein an FPGA utilizing unidirectional routing is subject to bridging or driver errors in response to a single-event upset (SEU) occurring on a routing bit of a configuration memory (CRAM); and wherein said bridging or driver errors arise in response to changing the driver of a net or bridging two nets with different drivers together, resulting in signal discrepancy on nets involved in driver switching or bridging due to the SEU.

28. An apparatus for increasing fault tolerance of a synthesized FPGA circuit, comprising: a computer configured for designing an FPGA circuit; and programming executable on said computer for: describing a logic function for implementation on an FPGA circuit and mapping to a plurality of look-up tables (LUTs); wherein each LUT comprises dual-output LUTs having at least two smaller internal LUTs and a carry chain; decomposing said logic function for each LUT into two subfunctions for processing by each of said dual-output LUTs; encoding converging logic to a fanout of a decomposed LUT; wherein in response to finding a fanout LUT with an unused input pin, the decomposed subfunction at the second output of a dual-output LUT is connected to the unused input pin, and masking logic is encoded into the fanout LUT while preserving functionality.

29. The apparatus of embodiment 28, wherein said decomposition and converging are applied inside the same programmable-logic block (PLB), and the PLB-level placement and routing is preserved.

30. The apparatus of embodiment 28, wherein said programming executable on said computer performs said converging logic by built-in hard macros.

31. The apparatus of embodiment 28, wherein said built-in hard macros comprise built-in carry chains or adders within a programmable-logic block (PLB).

32. The apparatus of embodiment 28, furthermore said programmable executable on a computer can find and utilize otherwise unused hard macros located at different PLBs to implement converging logic with minimized timing and area overhead.

33. The apparatus of embodiment 28, wherein if each of the fanout LUTs of a decomposed LUT has at least one unused input pin, a fully-masked decomposition is applied, in which all of the fanout LUTs are connected to the decomposed subfunctions and converging logic is encoded by fanout LUTs.

34. The apparatus of embodiment 28, wherein if at least one of the fanout LUTs has an unused input pin, then a partially-masked decomposition is applied and converging logic is encoded by fanout LUTs.

35. A method for increasing fault tolerance of an FPGA circuit, comprising: a computer configured for designing an FPGA circuit; and programming executable on said computer for: describing a logic circuit within an FPGA circuit design application executing on a computer which routes FPGA circuits through a synthesis process and arrives at a physical design for said logic circuit; performing a circuit analysis on said logic circuit; performing in-place iterations of reconfiguring, don't care X filling, and/or inversion of look-up table (LUT) bits toward increasing overall reliability of said logic circuit; and updating said FPGA circuit in response to said in-place iterations; wherein said in-place iterations are performed after placement and routing to preserve physical design while optimizing the logic circuit to mask faults originating upstream.

36. An apparatus for increasing fault tolerance of an FPGA circuit, comprising: a computer configured for designing an FPGA circuit; and programming executable on said computer for: describing a logic circuit for implementation on the FPGA circuit and routing of circuits through a synthesis process which arrives at a physical design; performing a circuit analysis on said logic circuit; performing in-place iterations of don't care X filling, and/or inversion of look-up table (LUT) bits toward increasing overall reliability of said logic circuit; and updating said FPGA circuit in response to said in-place iterations; wherein said in-place iterations are performed after placement and routing to preserve physical design while optimizing the logic circuit to mask faults originating upstream.

37. The apparatus of embodiment 36: wherein said programming executable on said computer is configured to perform said in-place iterations as iterations of an in-place X-filling (IPF) process to a convergence in which states are determined for satisfiability don't cares (SDCs); and wherein said programming executable on said computer is configured to perform said in-place X-filling (IPF) process in response to performing single event upset (SEU) fault analysis, followed by assigning satisfiability don't care (SDC) bits in response to criticality of LUT configuration bits by assigning said SDC bits to a logic value which maximizes correct logic output probability from a LUT toward minimizing fault impact from SEUs.

38. The apparatus of embodiment 36, wherein said programming executable on said computer is configured to perform said in-place iterations by performing single event upset (SEU) fault analysis to obtain weight values for routing configuration memory (CRAM) bits, followed by performing in-place logic inversion which inverts functions of driving logic in response to reassigning look-up table (LUT) polarities, followed by adjusting all of the truth tables of its fanout LUTs and driven LUTs to preserve functionality, whereby total weight of configuration memory (CRAM) bits on routing multiplexers is minimized.

39. A method for increasing fault tolerance of an FPGA circuit, comprising: a computer configured for designing an FPGA circuit; and programming executable on said computer for: describing a logic circuit within an FPGA circuit design application executing on a computer which routes FPGA circuits through a synthesis process and arrives at a physical design for said logic circuit; performing a circuit analysis on said logic circuit; performing in-place iterations of don't care X filling, and/or inversion of look-up table (LUT) bits toward increasing overall reliability of said logic circuit; and updating said FPGA circuit in response to said in-place iterations; wherein said in-place iterations are performed after placement and routing to preserve physical design while optimizing the logic circuit to mask faults originating upstream.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Comparison of Fault Rates with IPR

| | Fault Rate | | | LUT # | | | Runtime |
| --- | --- | --- | --- | --- | --- | --- | --- |
| Circuit | ABC | IPR | ROSE + IPR | ABC | IPR | ROSE + IPR | IPR (seconds) |
| barrel 64 | 2.02% | 0.93% | 0.94% | 1931 | 1931 | 1484 | 19.46 |
| fip_cordic_cla | 1.92% | 0.78% | 0.79% | 1042 | 1042 | 802 | 6.11 |
| fip_cordic_rca | 1.91% | 0.83% | 0.77% | 981 | 981 | 751 | 5.71 |
| mux8_128bit | 5.37% | 2.84% | 2.74% | 1923 | 1923 | 1796 | 1.52 |
| oc_ata-ocidec1 | 2.98% | 1.83% | 1.80% | 695 | 695 | 632 | 4.52 |
| oc_ata-ocidec2 | 3.20% | 1.69% | 1.73% | 840 | 840 | 742 | 4.89 |
| oc_ata_v | 2.15% | 1.13% | 1.11% | 514 | 514 | 411 | 1.43 |
| oc_dct_slow | 1.55% | 0.90% | 0.85% | 509 | 509 | 439 | 4.91 |
| oc_des_area_opt | 1.59% | 0.98% | 0.99% | 1190 | 1190 | 1007 | 20.51 |
| oc_des_des3area | 1.68% | 1.16% | 1.23% | 1782 | 1782 | 1479 | 39.64 |
| oc_rtc | 1.59% | 0.72% | 0.77% | 879 | 879 | 591 | 3.90 |
| oc_sdram | 1.97% | 0.89% | 0.86% | 729 | 729 | 553 | 1.89 |
| oc_sdram16 | 1.65% | 0.79% | 0.80% | 947 | 947 | 719 | 5.28 |
| GeoMean | 2.12% | 1.09% | 1.09% | 977.72 | 977.72 | 791.10 | 5.58 |
| Ratio | 1 | 0.52 | 0.51 | 1 | 1 | 0.81 | |
| MTTF | 1 | 1.94 | 2.40 | | | | |

TABLE 2

Comparison of Fault Rates with IPF

| | | LUT Failure Rate (%) | | | | Chip Failure Rate (%) | | | | Runtime (s) | | |
| --- | --- | --- | --- | --- | --- | --- | --- | --- | --- | --- | --- | --- |
| | | | | IPF | | | | IPF | | | IPF | |
| circuits | LUT # | ABC | IPD | Ham' | Out | ABC | IPD | Ham' | Out | IPD | Ham' | Out |
| alu4 | 507 | 0.34 | 0.09 | 0.24 | 0.24 | 0.36 | 0.33 | 0.28 | 0.28 | 1466 | 19.38 | 19.54 |
| apex2 | 687 | 0.27 | 0.03 | 0.24 | 0.24 | 0.25 | 0.22 | 0.23 | 0.23 | 1137 | 6.31 | 6.29 |
| apex4 | 594 | 1.55 | 0.34 | 0.96 | 0.96 | 1.64 | 1.50 | 1.39 | 1.39 | 1430 | 15.44 | 17.00 |
| des | 556 | 1.79 | 1.20 | 1.71 | 1.69 | 4.16 | 4.07 | 3.66 | 3.63 | 2022 | 5.69 | 5.82 |
| ex1010 | 668 | 1.21 | 0.28 | 1.13 | 1.13 | 1.62 | 1.52 | 1.43 | 1.43 | 1635 | 22.46 | 23.55 |
| ex5p | 384 | 0.70 | 0.20 | 0.67 | 0.67 | 0.93 | 0.89 | 0.88 | 0.88 | 795 | 4.63 | 6.23 |
| misex3 | 490 | 0.54 | 0.10 | 0.38 | 0.38 | 0.58 | 0.54 | 0.38 | 0.38 | 1235 | 16.71 | 17.04 |
| pdc | 1515 | 1.05 | 0.12 | 0.90 | 0.90 | 1.75 | 1.63 | 1.38 | 1.38 | 3429 | 854.2 | 1073.3 |
| seq | 705 | 0.66 | 0.11 | 0.52 | 0.52 | 0.73 | 0.67 | 0.59 | 0.59 | 1659 | 6.24 | 6.35 |
| spla | 1436 | 1.28 | 0.18 | 1.09 | 1.09 | 2.02 | 1.89 | 1.66 | 1.66 | 3270 | 765.4 | 924 |
| Ratio | — | 1 | 0.52 | 83.06% | 82.9% | 1 | 93.20% | 83.42% | 83.34% | 1 | 128.64 | 121.48 |

TABLE 2-continued

Comparison of Fault Rates with IPF

| circuits | LUT # | ABC | IPD | IPF Ham' | IPF Out | ABC | IPD | IPF Ham' | IPF Out | IPD | Ham' | Out |
|---|---|---|---|---|---|---|---|---|---|---|---|---|
| | | LUT Failure Rate (%) | | | | Chip Failure Rate (%) | | | | Runtime (s) | | |
| MTTF Ratio | — | 1 | 1.94 | 1.20 | 1.20 | 1 | 1.07 | 1.20 | 1.20 | — | — | — |

TABLE 3 / TABLE 3-continued

Comparison of Fault Rates with IPV for 4-LUTs & 6 LUTs

| Circuit | #LUT | Dimension x, y | w | Int. SER redux ILP | Int. SER redux SA | Runtime (s) ILP | Runtime (s) SA |
|---|---|---|---|---|---|---|---|
| *LUT size k = 4, Cluster Size N = 4* | | | | | | | |
| ex5p | 622 | 12, 12 | 32 | 2.51 | 2.51 | 4131.4 | 35.53 |
| alu4 | 744 | 14, 14 | 26 | 2.04 | 2.05 | 36000* | 41.34 |
| misex3 | 773 | 14, 14 | 26 | 3.05 | 3.05 | 4830.04 | 44.92 |
| apex4 | 821 | 15, 15 | 36 | 4.79 | 4.79 | 2990.69 | 58.06 |
| apex2 | 1014 | 17, 17 | 32 | 3.91 | 3.91 | 584.79 | 64.75 |
| seq | 1084 | 17, 17 | 32 | 3.32 | 3.32 | 2115.36 | 78.45 |
| ex1010 | 1120 | 17, 17 | 34 | 7.26 | 7.26 | 4132.28 | 70.36 |
| des | 1750 | 42, 42 | 18 | 1.16 | 1.17 | 36000* | 71.58 |
| spla | 2229 | 24, 24 | 48 | 17.22 | 17.22 | 4602.59 | 183.75 |
| pdc | 2304 | 25, 25 | 46 | 14.60 | 14.60 | 3159.54 | 206.31 |
| Avg. | — | — | — | 5.99 | 5.99 | — | — |
| *LUT size k = 6, Cluster Size N = 8* | | | | | | | |
| ex5p | 458 | 7, 7 | 38 | 1.81 | 1.90 | 36000* | 25.58 |
| alu4 | 524 | 8, 8 | 26 | 1.96 | 1.99 | 36000* | 27.20 |
| misex3 | 530 | 8, 8 | 28 | 2.98 | 2.98 | 3845.59 | 29.16 |
| apex4 | 618 | 9, 9 | 46 | 4.91 | 4.91 | 5876.77 | 42.97 |
| apex2 | 729 | 10, 10 | 38 | 3.75 | 3.75 | 295.2 | 51.34 |
| seq | 782 | 10, 10 | 40 | 3.40 | 3.40 | 7284.36 | 57.91 |
| ex1010 | 682 | 10, 10 | 44 | 7.46 | 7.46 | 5899.2 | 55.80 |
| des | 1056 | 42, 42 | 14 | 1.07 | 1.07 | 36000* | 34.45 |
| spla | 1524 | 14, 14 | 60 | 14.05 | 14.05 | 811.53 | 141.50 |
| pdc | 1609 | 14, 14 | 62 | 12.51 | 12.51 | 5474.11 | 153.77 |
| Avg. | — | — | — | 5.99 | 5.99 | — | — |

TABLE 4

Characteristics and Comparison of Fault Rates with IPD

| circuits | PI # | PO # | LUT# |
|---|---|---|---|
| alu4 | 14 | 8 | 507 |
| apex2 | 39 | 3 | 687 |
| apex4 | 9 | 19 | 594 |
| des | 256 | 245 | 556 |
| ex1010 | 10 | 10 | 668 |
| ex5p | 8 | 63 | 384 |
| misex3 | 14 | 14 | 490 |
| pdc | 16 | 40 | 1515 |
| seq | 41 | 35 | 705 |
| spla | 16 | 46 | 1436 |
| GeoMean | 21 | 24 | 683 |

| | | | IPD | | | | | | | |
|---|---|---|---|---|---|---|---|---|---|---|
| | | | dual-output 6 LUT | | | | ALM | | | | |
| circuits | BASE | FMD | 0% | 10% | 20% | 30% | 0% | 10% | 20% | 30% | Runtime (s) |
| alu4 | 0.34% | 0.33% | 0.34% | 0.33% | 0.25% | 0.27% | 0.09% | 0.11% | 0.13% | 0.17% | 1466 |
| apex2 | 0.29% | 0.26% | 0.29% | 0.26% | 0.20% | 0.21% | 0.03% | 0.05% | 0.07% | 0.12% | 1137 |
| apex4 | 1.16% | 1.10% | 1.16% | 1.10% | 0.97% | 0.99% | 0.31% | 0.41% | 0.49% | 0.60% | 1430 |
| des | 1.42% | 1.41% | 1.42% | 1.41% | 1.21% | 1.27% | 0.80% | 0.85% | 0.92% | 0.95% | 2022 |
| ex1010 | 1.24% | 1.05% | 1.24% | 1.05% | 0.65% | 0.72% | 0.27% | 0.37% | 0.47% | 0.54% | 1635 |
| ex5p | 0.73% | 0.62% | 0.73% | 0.62% | 0.51% | 0.52% | 0.24% | 0.30% | 0.32% | 0.39% | 795 |
| misex3 | 0.55% | 0.49% | 0.55% | 0.49% | 0.37% | 0.38% | 0.10% | 0.15% | 0.16% | 0.23% | 1235 |
| pdc | 0.91% | 0.83% | 0.91% | 0.83% | 0.61% | 0.63% | 0.16% | 0.22% | 0.31% | 0.38% | 3429 |
| seq | 0.63% | 0.56% | 0.63% | 0.56% | 0.44% | 0.45% | 0.11% | 0.15% | 0.21% | 0.28% | 1659 |
| spla | 1.14% | 1.05% | 1.14% | 1.05% | 0.78% | 0.82% | 0.20% | 0.31% | 0.40% | 0.48% | 3270 |
| GeoMean | 0.75% | 0.68% | 0.75% | 0.68% | 0.52% | 0.55% | 0.17% | 0.22% | 0.28% | 0.35% | 1807.8 |
| Ratio | 1.00 | 0.91 | 1.00 | 0.91 | 0.70 | 0.73 | 0.22 | 0.30 | 0.37 | 0.47 | — |
| MTTF Ratio | 1.00 | 1.10 | 1.00 | 1.10 | 1.43 | 1.36 | 4.51 | 3.32 | 2.70 | 2.12 | — |

What is claimed is:

1. An apparatus for increasing fault tolerance of an FPGA circuit, comprising:
   a computer configured for designing an FPGA circuit; and
   programming executable on said computer for:
   describing a logic circuit for implementation on the FPGA circuit and routing of circuits through a synthesis process which arrives at a physical design;
   performing a circuit analysis on said logic circuit;
   performing in-place iterations of reconfiguring, don't care X filling, and/or inversion of look-up table (LUT) bits toward increasing overall reliability of said logic circuit; and
   updating said FPGA circuit in response to said in-place iterations;
   wherein said in-place iterations are performed after placement and routing to preserve physical design while optimizing the logic circuit to mask faults originating upstream; and
   wherein said programming executable on said computer is configured to perform said in-place iterations by performing single event upset (SEU) fault analysis to obtain weight values for routing configuration memory (CRAM) bits, followed by performing in-place logic inversion which inverts functions of driving logic in response to reassigning look-up table (LUT) polarities, followed by adjusting all of the truth tables of its fanout LUTs and driven LUTs to preserve functionality, whereby total weight of configuration memory (CRAM) bits on routing multiplexers is minimized.

2. The apparatus as recited in claim 1, wherein said programming executable on said computer is configured to perform said in-place iterations as multiple iterations of an in-place resynthesis (IPR) process in which a group of look-up-tables (LUTs) are selected as a sub-network and identical configuration bits corresponding to complementary inputs of said group of LUTs are maximized, whereby faults seen at a pair of complementary inputs have a lower probability of propagation toward increasing overall reliability of the circuit.

3. The apparatus as recited in claim 1:
   wherein said programming executable on said computer is configured to perform said in-place iterations as iterations of an in-place X-filling (IPF) process to a convergence in which states are determined for satisfiability don't cares (SDCs); and
   wherein said programming executable on said computer is configured to perform said in-place X-filling (IPF) process in response to performing single event upset (SEU) fault analysis, followed by assigning satisfiability don't care (SDC) bits in response to criticality of LUT configuration bits by assigning said SDC bits to a logic value which maximizes correct logic output probability from a LUT toward minimizing fault impact from SEUs.

4. The apparatus as recited in claim 1, wherein said FPGA utilizes unidirectional routing architecture having programmable interconnect points (PIPs).

5. The apparatus as recited in claim 4, wherein an FPGA utilizing unidirectional routing is subject to bridging or driver errors in response to a single-event upset (SEU) occurring on a routing bit of a configuration memory (CRAM).

6. An apparatus for increasing fault tolerance of a synthesized FPGA circuit, comprising:
   a computer configured for designing an FPGA circuit; and
   programming executable on said computer for:
   describing a logic circuit for implementation on the FPGA circuit and mapping to a plurality of look-up tables (LUTs);
   performing placement and routing;
   performing single event upset (SEU) fault analysis to obtain weight values for each routing configuration memory (CRAM) bits; and
   performing in-place logic inversion which inverts functions of driving logic in response to reassigning look-up table (LUT) polarities, followed by adjusting all of the truth tables of its fanout LUTs and driven LUTs to preserve functionality, whereby total weight of all configuration memory (CRAM) bits on routing multiplexers is minimized.

7. The apparatus as recited in claim 6, wherein said programming executable on said computer is configured to perform driven logic adjustments to modify the logic functions of fan-out LUTs to preserve functionality affected by polarity inversion.

8. The apparatus as recited in claim 6, wherein said programming executable on said computer is configured to perform said single event upset (SEU) analysis in response to a logic block SEU analysis, connection box SEU analysis, logic routing SEU analysis, and a switch box SEU analysis.

9. The apparatus as recited in claim 6, wherein said FPGA utilizes unidirectional routing architecture having programmable interconnect points (PIPs).

10. The apparatus as recited in claim 9:
    wherein an FPGA utilizing unidirectional routing is subject to bridging or driver errors in response to a single-event upset (SEU) occurring on a routing bit of a configuration memory (CRAM); and
    wherein said bridging or driver errors arise in response to changing the driver of a net or bridging two nets with different drivers together, resulting in signal discrepancy on nets involved in driver switching or bridging due to the SEU.

11. An apparatus for increasing fault tolerance of an FPGA circuit, comprising:
    a computer configured for designing an FPGA circuit; and
    programming executable on said computer for:
    describing a logic circuit for implementation on the FPGA circuit and routing of circuits through a synthesis process which arrives at a physical design;
    performing a circuit analysis on said logic circuit;
    performing in-place iterations of don't care X filling, and/or inversion of look-up table (LUT) bits toward increasing overall reliability of said logic circuit; and
    updating said FPGA circuit in response to said in-place iterations;
    wherein said in-place iterations are performed after placement and routing to preserve physical design while optimizing the logic circuit to mask faults originating upstream; and
    wherein said programming executable on said computer is configured to perform said in-place iterations by performing single event upset (SEU) fault analysis to obtain weight values for routing configuration memory (CRAM) bits, followed by performing in-place logic inversion which inverts functions of driving logic in response to reassigning look-up table (LUT) polarities, followed by adjusting all of the truth tables of its fanout LUTs and driven LUTs to preserve functionality, whereby total weight of configuration memory (CRAM) bits on routing multiplexers is minimized.

12. A method for increasing fault tolerance of an FPGA circuit, comprising:

a computer configured for designing an FPGA circuit; and
programming executable on said computer for:
describing a logic circuit within an FPGA circuit design application executing on a computer which routes FPGA circuits through a synthesis process and arrives at a physical design for said logic circuit;
performing a circuit analysis on said logic circuit;
performing in-place iterations of don't care X filling, and/or inversion of look-up table (LUT) bits toward increasing overall reliability of said logic circuit; and
updating said FPGA circuit in response to said in-place iterations;
wherein said in-place iterations are performed after placement and routing to preserve physical design while optimizing the logic circuit to mask faults originating upstream; and
performing driven logic adjustments to modify the logic functions of fan-out LUTs to preserve functionality affected by polarity inversion.

13. The method as recited in claim 12, further configured for said FPGA utilizing a unidirectional routing architecture having programmable interconnect points (PIPs).

14. The method as recited in claim 13, wherein an FPGA utilizing unidirectional routing is subject to bridging or driver errors in response to a single-event upset (SEU) occurring on a routing bit of a configuration memory (CRAM).

15. An apparatus for increasing fault tolerance of an FPGA circuit, comprising:
a computer configured for designing an FPGA circuit; and
programming executable on said computer for:
describing a logic circuit for implementation on the FPGA circuit and routing of circuits through a synthesis process which arrives at a physical design;
performing a circuit analysis on said logic circuit;
performing in-place iterations of reconfiguring, don't care X filling, and/or inversion of look-up table (LUT) bits toward increasing overall reliability of said logic circuit; and
updating said FPGA circuit in response to said in-place iterations;
wherein said in-place iterations are performed after placement and routing to preserve physical design while optimizing the logic circuit to mask faults originating upstream; and
wherein said programming executable on said computer is configured to perform driven logic adjustments to modify the logic functions of fan-out LUTs to preserve functionality affected by polarity inversion.

16. The apparatus as recited in claim 15, wherein said FPGA utilizes unidirectional routing architecture having programmable interconnect points (PIPs).

17. The apparatus as recited in claim 16, wherein an FPGA utilizing unidirectional routing is subject to bridging or driver errors in response to a single-event upset (SEU) occurring on a routing bit of a configuration memory (CRAM).

18. An apparatus for increasing fault tolerance of an FPGA circuit, comprising:
a computer configured for designing an FPGA circuit; and
programming executable on said computer for:
describing a logic circuit for implementation on the FPGA circuit and routing of circuits through a synthesis process which arrives at a physical design;
performing a circuit analysis on said logic circuit;
performing in-place iterations of reconfiguring, don't care X filling, and/or inversion of look-up table (LUT) bits toward increasing overall reliability of said logic circuit; and
updating said FPGA circuit in response to said in-place iterations;
wherein said in-place iterations are performed after placement and routing to preserve physical design while optimizing the logic circuit to mask faults originating upstream; and
wherein said programming executable on said computer is configured to perform said single event upset (SEU) analysis in response to a logic block SEU analysis, connection box SEU analysis, logic routing SEU analysis, and a switch box SEU analysis.

19. The apparatus as recited in claim 18, wherein said FPGA utilizes unidirectional routing architecture having programmable interconnect points (PIPs).

20. The apparatus as recited in claim 19, wherein an FPGA utilizing unidirectional routing is subject to bridging or driver errors in response to a single-event upset (SEU) occurring on a routing bit of a configuration memory (CRAM).

21. An apparatus for increasing fault tolerance of an FPGA circuit, comprising:
a computer configured for designing an FPGA circuit; and
programming executable on said computer for:
describing a logic circuit for implementation on the FPGA circuit and routing of circuits through a synthesis process which arrives at a physical design;
performing a circuit analysis on said logic circuit;
performing in-place iterations of reconfiguring, don't care X filling, and/or inversion of look-up table (LUT) bits toward increasing overall reliability of said logic circuit; and
updating said FPGA circuit in response to said in-place iterations;
wherein said in-place iterations are performed after placement and routing to preserve physical design while optimizing the logic circuit to mask faults originating upstream;
wherein said FPGA utilizes unidirectional routing architecture having programmable interconnect points (PIPs);
wherein an FPGA utilizing unidirectional routing is subject to bridging or driver errors in response to a single-event upset (SEU) occurring on a routing bit of a configuration memory (CRAM); and
wherein said bridging or driver errors arise in response to changing the driver of a net or bridging two nets with different drivers together, resulting in signal discrepancy on nets involved in driver switching or bridging due to the SEU.

22. A method for increasing fault tolerance of an FPGA circuit, comprising:
a computer configured for designing an FPGA circuit; and
programming executable on said computer for:
describing a logic circuit within an FPGA circuit design application executing on a computer which routes FPGA circuits through a synthesis process and arrives at a physical design for said logic circuit;
performing a circuit analysis on said logic circuit;
performing in-place iterations of don't care X filling, and/or inversion of look-up table (LUT) bits toward increasing overall reliability of said logic circuit; and
updating said FPGA circuit in response to said in-place iterations;
wherein said in-place iterations are performed after placement and routing to preserve physical design while optimizing the logic circuit to mask faults originating upstream; and performing said single event upset (SEU) analysis in response to a logic block SEU analysis, connection box SEU analysis, logic routing SEU analysis, and a switch box SEU analysis.

23. A method for increasing fault tolerance of an FPGA circuit, comprising:
  a computer configured for designing an FPGA circuit; and
  programming executable on said computer for:
  describing a logic circuit within an FPGA circuit design application executing on a computer which routes FPGA circuits through a synthesis process and arrives at a physical design for said logic circuit;
  performing a circuit analysis on said logic circuit;
  performing in-place iterations of don't care X filling, and/or inversion of look-up table (LUT) bits toward increasing overall reliability of said logic circuit; and
  updating said FPGA circuit in response to said in-place iterations;
  wherein said in-place iterations are performed after placement and routing to preserve physical design while optimizing the logic circuit to mask faults originating upstream; and
  wherein said FPGA is utilizing a unidirectional routing architecture having programmable interconnect points (PIPs);
  wherein an FPGA utilizing unidirectional routing is subject to bridging or driver errors in response to a single-event upset (SEU) occurring on a routing bit of a configuration memory (CRAM); and
  wherein said bridging or driver errors arise in response to changing the driver of a net or bridging two nets with different drivers together, resulting in signal discrepancy on nets involved in driver switching or bridging due to the SEU.

* * * * *